US008889261B2

(12) United States Patent
Carbary et al.

(10) Patent No.: US 8,889,261 B2
(45) Date of Patent: Nov. 18, 2014

(54) GUNNABLE ADHESIVE COMPOSITION FOR USE IN CONSTRUCTION MEMBRANE APPLICATIONS

(75) Inventors: Lawrence Carbary, Midland, MI (US); Loren Lower, Sanford, MI (US); Aaron Seitz, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 57 days.

(21) Appl. No.: 13/376,115

(22) PCT Filed: Jun. 4, 2010

(86) PCT No.: PCT/US2010/037450
§ 371 (c)(1),
(2), (4) Date: Feb. 6, 2012

(87) PCT Pub. No.: WO2010/141852
PCT Pub. Date: Dec. 9, 2010

(65) Prior Publication Data
US 2012/0124931 A1   May 24, 2012

Related U.S. Application Data

(60) Provisional application No. 61/184,002, filed on Jun. 4, 2009.

(51) Int. Cl.
*B32B 9/04* (2006.01)
*C09J 183/04* (2006.01)
*E04B 1/62* (2006.01)

(52) U.S. Cl.
CPC ............... *C09J 183/04* (2013.01); *E04B 1/625* (2013.01); *Y10S 428/92* (2013.01)
USPC ............ 428/448; 428/920; 525/477; 156/329

(58) Field of Classification Search
None
See application file for complete search history.

(56) References Cited

U.S. PATENT DOCUMENTS

| | | | |
|---|---|---|---|
| 2,676,182 A | 4/1954 | Daudt et al. | |
| 3,627,851 A | 12/1971 | Brady | |
| 3,772,247 A | 11/1973 | Flannigan | |
| 3,900,102 A | 8/1975 | Hurst | |
| 4,611,042 A | 9/1986 | Rivers-Farrell et al. | |
| 4,774,310 A | 9/1988 | Butler | |
| 4,962,076 A | 10/1990 | Chu et al. | |
| 5,051,455 A | 9/1991 | Chu et al. | |
| 5,053,442 A | 10/1991 | Chu et al. | |
| 5,082,706 A | 1/1992 | Tangney | |
| 5,091,235 A | 2/1992 | Vergnano | |
| 5,147,916 A | 9/1992 | Sweet | |
| 5,248,739 A | 9/1993 | Schmidt et al. | |
| 5,340,887 A * | 8/1994 | Vincent et al. | 525/477 |
| 5,561,203 A * | 10/1996 | Strong et al. | 525/477 |
| 6,355,333 B1 | 3/2002 | Waggoner et al. | |
| 6,401,402 B1 | 6/2002 | Williams | |
| 6,725,610 B2 | 4/2004 | Murphy et al. | |
| 6,730,397 B2 | 5/2004 | Melancon et al. | |
| 6,890,601 B2 * | 5/2005 | Griswold et al. | 427/387 |
| 8,580,073 B2 * | 11/2013 | Behl et al. | 156/325 |
| 2003/0041537 A1 | 3/2003 | Glover et al. | |

FOREIGN PATENT DOCUMENTS

| | | |
|---|---|---|
| EP | 0537784 A1 | 4/1993 |
| JP | H05-214316 A | 8/1993 |
| JP | 2006-503958 A | 2/2006 |
| WO | WO 2004/037941 | 5/2004 |
| WO | WO 2008/048763 A1 | 4/2008 |
| WO | WO 2010/008749 A1 | 1/2010 |
| WO | WO 2010/141852 A1 | 12/2010 |

OTHER PUBLICATIONS

International Search Report for Application No. PCT/US2010/037450 dated Jul. 29, 2010, 3 pages.
T. Peitz, "Continuous Processing of Hot Melt Adhesives on Co-Rotating Twin Screw Extruders", 1996 Hot Melt Symposium, p. 37-45.
English language abstract not available for JP H05-214316; however, see English language equivalent US 5,248,739. Original document extracted from the espacenet.com database on Jan. 23, 2014, 34 pages.
English language abstract not available for JP 2006-503958; however, see English language equivalent WO 2004/037941. Original document extracted from the espacenet.com database on Jan. 23, 2014, 27 pages.
"Silicones", Apr. 15, 2003, Encyclopedia of Polymer Science and Technology, Wiley, US, pp. 765-841.

* cited by examiner

*Primary Examiner* — Marc Zimmer
(74) *Attorney, Agent, or Firm* — Howard & Howard Attorneys PLLC

(57) ABSTRACT

A gunnable adhesive composition includes a silicone resin and an organopolysiloxane, or a reaction product thereof; as well as a filler and a solvent. The silicone resin and the organopolysiloxane are present in amounts to provide a resin/polymer ratio ranging from 58% to 64%. The gunnable adhesive composition may be applied to low surface energy substrates at ambient temperatures without primer or other surface treatment. The gunnable adhesive composition and adhesive product thereof are useful in weather barrier applications, such as building wraps.

28 Claims, 1 Drawing Sheet

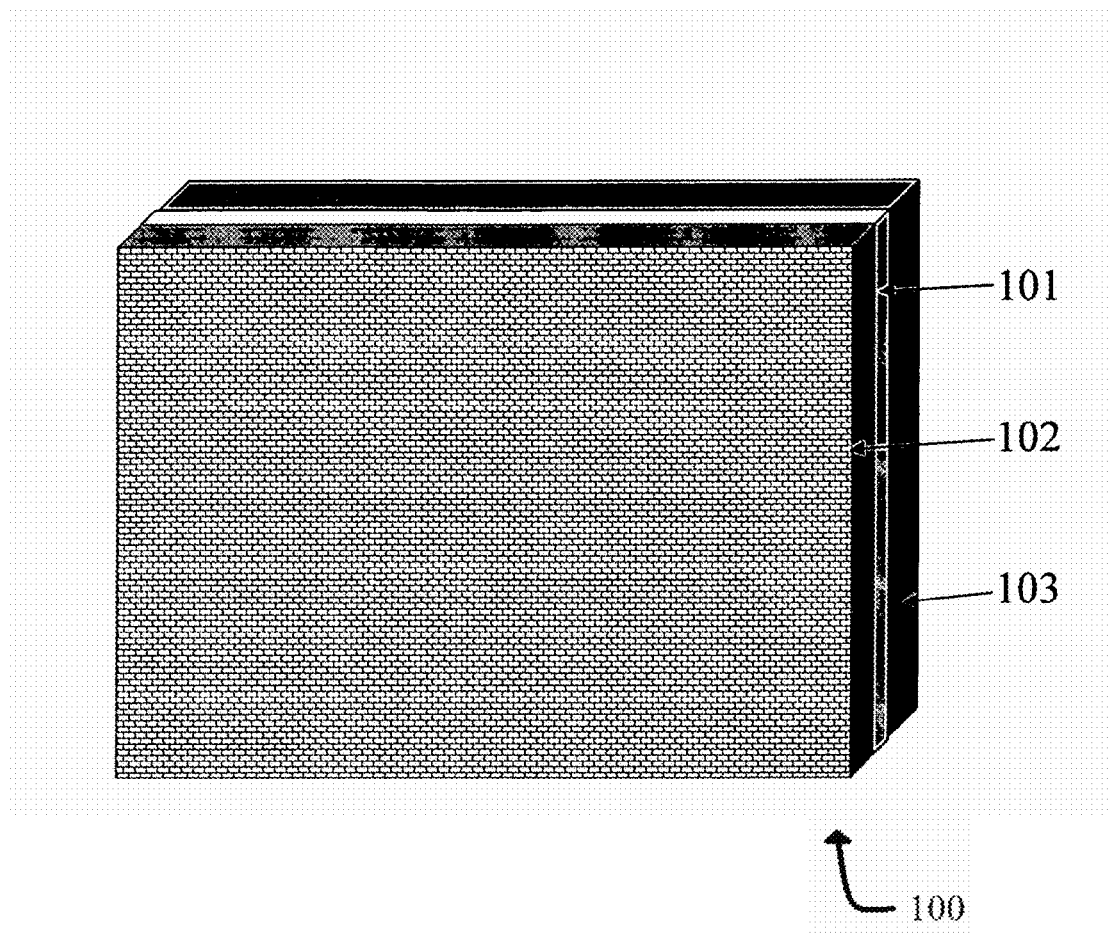

GUNNABLE ADHESIVE COMPOSITION FOR USE IN CONSTRUCTION MEMBRANE APPLICATIONS

RELATED APPLICATIONS

This application claims priority to and all the advantages of International Patent Application No. PCT/US2010/037450, filed on Jun. 4, 2010, which claims priority to U.S. Provisional Patent Application No. 61/184,002, filed on Jun. 4, 2009.

BACKGROUND

The trend toward energy conservation has driven changes in commercial building codes to incorporate weather barriers. For purposes of this application, the term 'weather barrier' means a substrate that inhibits or reduces passage of air or vapours (e.g., water), or both. Many of these weather barriers are polyethylene, polytetrafluoroethylene (e.g., TEFLON®), polyvinyl chloride (PVC), thermoplastic polyolefin (such as TYVEK® from DuPont), or other low surface energy organic substrates. For example, a weather barrier may be wrapped over sheathing and under exterior siding to resist air infiltration and water intrusion into a building. To improve efficacy, it is desirable for a weather barrier system to be continuous, i.e., a sealant is used to bridge the weather barrier with a fenestration element.

There are problems associated with conventional sealants. Conventional sealants typically exhibit poor adhesion to polyethylene and other low surface energy substrates. They may require a primer or other surface treatment (such as corona treatment) to achieve adhesion, and surface treatment adds labour intensity and additional cost to the process of applying a weather barrier. Conventional sealants may not be flexible enough to allow for joint movement, for example, during thermal expansion.

Building owners, contractors, architects and consultants want a primerless, flexible sealant that provides a bond between the weather barrier and building substrates, e.g., fenestration substrates to form a continuous, robust weather barrier system. This reduces air leakage and translates to lower energy costs and meeting new energy building codes. Solutions that exist today utilize a primer and do not offer robust adhesion to allow movement between the substrates.

BRIEF SUMMARY OF THE INVENTION

This invention pertains to a gunnable adhesive composition and methods for its preparation and use. The gunnable adhesive composition is useful in construction applications, such as weather barrier applications.

BRIEF DESCRIPTIONS OF THE DRAWINGS

FIG. 1 is an embodiment of a laminate structure according to the present invention.

DETAILED DESCRIPTION OF THE INVENTION

All amounts, ratios, and percentages are by weight unless otherwise indicated. The following is a list of definitions, as used herein.

Definitions and Usage of Terms

For purposes of this application, the articles "a", "an", and "the" each refer to one or more, unless otherwise indicated.

The term "low surface energy" means having a surface energy less than 45 mJ/m$^2$, alternatively less than 40 mJ/m$^2$, alternatively less than 35 mJ/m$^2$. Examples of such low surface energy substrates useful in the method described herein include polyethylene, polypropylene, polyamide, and polytetrafluoroethylene. Weight average and number average molecular weight values were determined following ASTM D5296-05 and calculated as polystyrene molecular weight equivalents. All viscosity values were taken at 25° C. unless otherwise indicated. Unless otherwise indicated Kinematic viscosity measurements (cSt) were determined by timed flow in a calibrated viscosity tube and dynamic viscosity measurements (mPa·s) were measured using a Brookfield® HB DV-II+ PRO apparatus with a cone plate spindle at a speed of 5 rpm.

Gunnable Adhesive Composition

The gunnable adhesive composition comprises:
I) a component selected from a mixture, a reaction product, and a combination thereof, of ingredients a) and b), where
   ingredient a) is a silicone resin, and
   ingredient b) is an organopolysiloxane,
   where the silicone resin and the organopolysiloxane are added in amounts to provide a ratio of silicone resin to organopolysiloxane (R/P ratio) ranging from 58% to 64%,
II) a filler,
III) a solvent,
optionally
IV) a silane crosslinker, and
optionally
V) a catalyst.

The gunnable adhesive composition hardens to form an adhesive product. The gunnable adhesive composition may be curable or non-curable. For example, when the gunnable adhesive composition is curable, the gunnable adhesive composition may comprise ingredients I), V), II), III), and optionally IV); and may harden to form an adhesive product by curing. Alternatively, the gunnable adhesive composition may be non-curable and comprise ingredients I), II), III), and optionally IV); and may harden to form an adhesive product by cooling, solvent removal, or a combination thereof.

Silicone Resin

The silicone resin useful herein contains monofunctional units represented by $R^1_3SiO_{1/2}$ and tetrafunctional units represented by $SiO_{4/2}$. $R^1$ represents a substituted or unsubstituted monovalent hydrocarbon group. Silicone resins of this type are well known in the art as one of the ingredients present in organosiloxane compositions used as pressure sensitive adhesives.

The silicone resin is soluble in liquid hydrocarbons such as benzene, toluene, xylene, heptane and the like or in liquid organosilicon compounds such as low viscosity cyclic and linear polydiorganosiloxanes. Examples include the solvents described below.

In the $R^1_3SiO_{1/2}$ unit, $R^1$ may be a monovalent hydrocarbon group containing up to 20 carbon atoms, alternatively 1 to 10 carbon atoms. Examples of suitable hydrocarbon groups for $R^1$ include alkyl groups, such as methyl, ethyl, propyl, pentyl, octyl, undecyl and octadecyl; alkenyl groups, such as vinyl, allyl and 5-hexenyl; cycloaliphatic groups, such as cyclohexyl and cyclohexenylethyl; and aryl groups such as phenyl, tolyl, xylyl, benzyl and 2-phenylethyl. Non-reactive substituents that can be present on $R^1$ include but are not limited to halogen and cyano. Typical substituted hydrocarbon groups that can be represented by $R^1$ include but are not limited to chloromethyl and 3,3,3-trifluoropropyl.

At least one-third, alternatively at least two-thirds of the R1 groups in the $R^1{}_3SiO_{1/2}$ unit may be methyl groups. Examples of $R^1{}_3SiO_{1/2}$ units include but are not limited to $Me_3SiO_{1/2}$, $PhMe_2SiO_{1/2}$ and $Me_2ViSiO_{1/2}$ where Me, Ph and Vi denote methyl, phenyl and vinyl, respectively. The silicone resin may contain two or more of these units.

The molar ratio of the $R^1{}_3SiO_{1/2}$ and $SiO_{4/2}$ units in the silicone resin may range from 0.5/1 to 1.5/1, alternatively from 0.6/1 to 0.9/1. These mole ratios are conveniently measured by $^{29}Si$ NMR spectroscopy. This technique is capable of quantitatively determining the concentration of $R^1{}_3SiO_{1/2}$ ("M") and $SiO_{4/2}$ ("Q") units derived from the silicone resin and from the neopentamer, $Si(R^1{}_3SiO)_4$, present in the initial silicone resin, in addition to the total hydroxyl content of the silicone resin.

The $R^1{}_3SiO_{1/2}$ to $SiO_{4/2}$ ratio can be expressed as {M(resin)+M(neopentamer)}/{Q(resin)+Q(neopentamer)} and represents the ratio of the total number of triorganosiloxy groups of the resinous and neopentamer portions of the silicone resin to the total number of silicate groups in the resinous and neopentamer portions.

The silicone resin may contain 2.0% or less, alternatively 0.7% or less, alternatively 0.3% or less, of terminal units represented by the formula $XSiO_{3/2}$, where X represents hydroxy or a hydrolyzable group exemplified by alkoxy such as methoxy and ethoxy; alkenyloxy such as isopropenyloxy; ketoximo such as methyethylketoximo; carboxy such as acetoxy; amidoxy such as acetamidoxy; and aminoxy such as N,N-dimethylaminoxy. The concentration of silanol groups present in the silicone resin can be determined using Fourier transform infrared spectrophotometry (FTIR).

The weight average molecular weight, Mw, to achieve the desired flow characteristics of the silicone resin will depend at least in part on the molecular weight of the silicone resin and the type of hydrocarbon groups, represented by $R^1$, that are present in this ingredient. The Mw of the silicone resin may be greater than 3,000, alternatively Mw of the silicone resin may range from 14,000 to 19,000.

The silicone resin can be prepared by any suitable method. Silicone resins of this type have reportedly been prepared by cohydrolysis of the corresponding silanes or by silica hydrosol capping methods known in the art. The silicone resin may be prepared by the silica hydrosol capping processes of Daudt, et al., U.S. Pat. No. 2,676,182; of Rivers-Farrell et al., U.S. Pat. No. 4,611,042; and of Butler, U.S. Pat. No. 4,774,310.

The intermediates used to prepare the silicone resin are typically triorganosilanes of the formula $R^1{}_3SiX'$, where $X'$ represents a hydrolyzable group, and either a silane with four hydrolyzable groups such as halogen, alkoxy or hydroxyl, or an alkali metal silicate such as sodium silicate.

It is desirable that the content of silicon-bonded hydroxyl groups (i.e., $HOSiO_{3/2}$ groups) in the silicone resin be below 1.2% of the total weight of the silicone resin, alternatively below 0.5%, and alternatively below 0.3%. Silicon-bonded hydroxyl groups formed during preparation of the silicone resin may be converted to trihydrocarbylsiloxy groups or hydrolyzable groups by reacting the silicone resin with a silane, disiloxane or disilazane containing the appropriate terminal group. Silanes containing hydrolyzable groups are typically added in excess of the quantity required to react with the silicon-bonded hydroxyl groups of the silicone resin.

The silicone resin may be one silicone resin. Alternatively, the silicone resin may comprise two or more silicone resins, where the resins differ in at least one of the following properties: structure, hydroxyl and/or hydrolyzable group content, molecular weight, siloxane units, and sequence. When more than one silicone resin is present, one resin may have a lower molecular weight than the other, and the lower molecular weight resin may be a tackifying resin.

Alternatively, a tackifying resin disclosed in U.S. Pat. No. 6,730,397 at col. 10 to col. 12 may be used. The tackifying resins useful herein include those resins containing monofunctional (M) units represented by $R^1{}_3SiO_{1/2}$, and tetrafunctional (Q) units represented by $SiO_{4/2}$, where $R^1$ is as described above. These may have Mw ranging from 4,000 to 9,000, a ratio of M units to Q units (M/Q ratio) ranging from 0.9 to 1.1, and a content of silicon-bonded hydroxy groups of less than 0.7%.

MQ silicone tackifying resins may be copolymeric silicone resins having M units bonded to Q units, each of which is bonded to at least one other Q unit. Some of the Q units are bonded to hydroxyl groups resulting in trifunctional (TOH) units represented by $HOSiO_{3/2}$, thereby accounting for the silicon-bonded hydroxyl content of the silicone tackifying resin, and some are bonded only to other Q units. Such resins are described in, for example, U.S. Pat. No. 2,676,182 to Daudt, et al., U.S. Pat. No. 3,627,851 to Brady, U.S. Pat. No. 3,772,247 to Flannigan, and U.S. Pat. No. 5,248,739 to Schmidt, et al.

Suitable MQ silicone tackifying resins can be prepared by any method which provides a soluble resin consisting essentially of M and Q units which meet the requirements described above. Such MQ resins may be prepared by the silica hydrosol capping process described in U.S. Pat. No. 2,676,182 to Daudt, et al., U.S. Pat. No. 3,627,851 to Brady, and U.S. Pat. No. 3,772,247 to Flannigan. Briefly stated, the process includes limiting the concentration of the sodium silicate solution, and/or the silicon-to-sodium ratio in the sodium silicate, and/or the time before capping the neutralized sodium silicate solution to generally lower values than those disclosed by Daudt, et al. The neutralized silica hydrosol may be stabilized with an alcohol, such as 2-propanol, and capped with M units as soon as possible after being neutralized. It is important to note that the level of silicon bonded hydroxyl groups on the MQ resin may be reduced, for example to less than 1.5%, alternatively to no greater than 1.2%, alternatively to no greater than 1.0%, and alternatively to no greater than 0.8%. This may be accomplished, for example, by reacting hexamethyldisilazane with the silicone tackifying resin. Such a reaction may be catalyzed, for example, with trifluoroacetic acid. Alternatively, trimethylchlorosilane or trimethylsilylacetamide may be reacted with the silicone tackifying resin, a catalyst not being necessary in this case. Such resins are may be performed in solvent.

Various suitable low silanol content silicone tackifying resins are commercially available from sources such as Dow Corning Corporation of Midland, Mich., Momentive Performance Materials of Albany, N.Y. and Bluestar Silicones USA Corp. of East Brunswick, N.J. Examples are disclosed in U.S. Pat. No. 5,082,706 to Tangney. Such resins are may be supplied in organic solvent and may be employed in the gunnable adhesive composition as received.

The amount of silicone tackifying resin added to the gunnable adhesive composition can affect the levels of release and peel forces of the gunnable adhesive compositions. The amount of tackifying resin may range from 0% to 50%, alternatively 20% to 30%, based on the combined weight of all silicone resins in the gunnable adhesive. Without wishing to be bound by theory, it is thought that tackifying resin improves adhesion.

Alternatively, an organic tackifying resin could be used in addition to, or instead of, the silicone tackifying resin described above. Suitable organic tackifying resins include wax, polyisobutylene (PIB), styrene butadiene, styrene isoprene, and combinations thereof.

Organopolysiloxane

The organopolysiloxane useful herein comprises difunctional units of the formula $R^2R^3SiO$ and terminal units of the formula $R^4_aX^1_{3-a}SiG$— where $R^2$ is an alkoxy group or a monovalent unsubstituted or substituted hydrocarbon group; $R^3$ is a unsubstituted or substituted monovalent hydrocarbon group; $R^4$ is aminoalkyl or $R^1$ group; $X^1$ is a hydrolyzable group; G can be an oxygen atom or a divalent group linking the silicon atom of the terminal unit with another silicon atom and a is 0 or 1. The organopolysiloxane can optionally contain up to about 20 percent, based on total of trifunctional units of the formula $R^3SiO_{3/2}$ where $R^3$ is as described previously. At least 50%, alternatively at least 80%, of the groups represented by $R^2$ and $R^3$ in the $R^2R^3SiO$ units may be lower alkyl such as methyl. The organopolysiloxane may have a linear structure.

The terminal units present on the organopolysiloxane may be represented by the formula $R^4_aX^1_{3-a}SiG$— where $X^1$ is a hydrolyzable group, $R^4$ is aminoalkyl or $R^1$, G is a divalent group linking the silicon atom of the terminal unit with another silicon atom and a is 0 or 1. Typically the organopolysiloxane contains an average of two or more hydrolyzable ($X^1$) groups per molecule in order to form a crosslinked product. Typical hydrolyzable groups represented by $X^1$ include but are not limited to hydroxy, alkoxy such as methoxy and ethoxy, alkenyloxy such as isopropenyloxy, ketoximo such as methyethylketoximo, carboxy such as acetoxy, amidoxy such as acetamidoxy and aminoxy such as N,N-dimethylaminoxy.

In the terminal groups when a is 0 the groups represented by $X^1$ can be alkoxy, ketoximo, alkenyloxy, carboxy, aminoxy or amidoxy. When a is 1, $X^1$ may be alkoxy and $R^4$ may be alkyl such as methyl or ethyl, or aminoalkyl such as aminopropyl or 3-(2-aminoethylamino)propyl. The amino portion of the aminoalkyl group can be primary, secondary or tertiary.

In the formula for the terminal unit G can be an oxygen atom or a divalent group or atom that is hydrolytically stable. By hydrolytically stable it is meant that it is not hydrolyzable and links the silicon atom(s) of the terminal unit to another silicon atom in the organopolysiloxane such that the terminal unit is not removed during curing of the composition and the curing reaction is not adversely affected. Hydrolytically stable linkages represented by G include but are not limited to oxygen, hydrocarbylene such as alkylene and phenylene, hydrocarbylene containing one or more hetero atoms selected from oxygen, nitrogen and sulfur, and combinations of these linking groups. G can represent a silalkylene linkage such as —(OSiMe$_2$)CH$_2$CH$_2$—, —(CH$_2$CH$_2$SiMe$_2$)(OSiMe$_2$)CH$_2$CH$_2$—, —(CH$_2$CH$_2$SiMe$_2$)O—, (CH$_2$CH$_2$SiMe$_2$)OSiMe$_2$)O—, —(CH$_2$CH$_2$SiMe$_2$)CH$_2$CH$_2$— and —CH$_2$CH$_2$—, a siloxane linkage such as —(OSiMe$_2$)O— or, more preferably, an oxygen atom.

Specific examples of preferred terminal units include, but are not limited to, (MeO)$_3$SiCH$_2$CH$_2$—, (MeO)$_3$SiO—, Me(MeO)$_2$SiO—, H$_2$NCH$_2$CHN(H)(CH$_2$)$_3$SiO—, (EtO)$_3$SiO—, (MeO)$_3$SiCH$_2$CH$_2$SiMeCH$_2$SiMeCH$_2$CH$_2$SiMe$_2$O—, Me$_2$NOSiO—, MeC(O)N(H)SiO— and CH$_2$=C(CH$_3$)OSiO—. Me in these formulae represents methyl and Et represents ethyl.

When $X^1$ contains an alkoxy group, it may be desirable to separate this $X^1$ group from the closest siloxane unit by an alkylene group such as ethylene. In this instance $R^4_aX^1_{3-a}SiG$— would be, for example, (MeO)$_3$SiCH$_2$CH$_2$Si(Me$_2$)O—. Methods for converting alkoxy groups to trialkoxysilylalkyl groups are described in the prior art. For example, moisture reactive groups having the formulae (MeO)$_3$SiO— and Me(MeO)$_2$SiO— can be introduced into a silanol-terminated polyorganosiloxane by compounds having the formulae (MeO)$_4$Si and Me(MeO)$_3$Si, respectively. Alternatively, compounds having the formulae (MeO)$_3$SiH and Me(MeO)$_2$SiH, respectively, can be used when the polyorganosiloxane contains silanol groups or alkenyl groups such as vinyl and a platinum group metal or a compound thereof as a hydrosilylation reaction catalyst. It will be understood that other hydrolyzable groups such as dialkylketoximo, alkenyloxy and carboxy can replace the alkoxy group.

The organopolysiloxane used in the gunnable adhesive composition may be a polydimethylsiloxane containing three alkoxy or ketoximo groups, two ketoximo groups or two alkoxy groups together with either an alkyl or aminoalkyl group.

The viscosity of the organopolysiloxane may range from 0.02 Pa·s to 100 Pa·s at 25° C., alternatively 0.35 to about 60 Pa·s.

The ratio of silicone resin to organopolysiloxane (R/P ratio) is measured by weight of dry (i.e., solventless) silicone resin divided by the quantity of (the weight of dry silicone resin plus the weight of organopolysiloxane). The R/P ratio may range from 58% to 64%, alternatively 60% to 62%. Without wishing to be bound by theory it is thought that adhesion may be detrimentally affected by a R/P ratio less than 58%, however R/P ratio above 64% may result in slump and/or poor extrusion capability.

Alternatively, a reaction product of the silicone resin and the organopolysiloxane may be used in addition to, or instead of, all or a portion of the silicone resin and the organopolysiloxane in the gunnable adhesive composition.

The combination of silicone resin and organopolysiloxane would be a solid at room temperature. Therefore, solvent, and optionally crosslinker, are added to make the gunnable adhesive composition flowable at room temperature and impart extrusion capability. Alternatively, the silicone resin may be provided in a solvent before combining it with the other ingredients of the gunnable adhesive composition.

Crosslinker

A silane crosslinker may optionally be added to the gunnable adhesive composition. The silane crosslinker is represented by the formula $R^1_nSiZ_{(4-n)}$, where $R^1$ is as described previously and Z is a hydrolyzable group that reacts with the terminal groups of at least the organopolysiloxane under ambient conditions to form a cured material, and n is 0, 1 or 2. $R^1$ may be an alkyl and/or a phenyl group. Suitable hydrolyzable groups represented by Z include but are not limited to alkoxy containing from 1 to 4 carbon atoms, carboxy such as acetoxy, ketoximo such as methylethylketoximo and aminoxy. When n is 2 in the silane crosslinker, the organopolysiloxane may contain 3 $X^1$ groups (e.g., a=0).

Suitable silane crosslinkers include but are not limited to methyltrimethoxysilane, isobutyltrimethoxysilane, methyltris(methylethylketoximo)silane, methyltriethoxysilane, isobutyltriethoxysilane, methyltriacetoxysilane, vinyloximosilane, and alkyl orthosilicates such as ethyl orthosilicate.

When used, the amount of silane crosslinker may range from 0.5 to 15 parts per hundred (pph) based on the combined amount of silicone resin and organopolysiloxane, alternatively 1.5 to 15 pph, and alternatively 1 to 8 pph. If too much silane crosslinker is present, the green strength and/or cure rate of the gunnable adhesive composition may decrease. If the silane crosslinker is volatile it may be necessary to use an excess amount to achieve the 0.5 to 15 pph in the final gunnable adhesive composition during the manufacturing method. One skilled in the art will be able to determine the amount need to produce a gunnable adhesive composition with 0.5 to 15 pph. The exact amount of crosslinker will depend on various factors including the type of crosslinker selected and the selection of silicone resin, organopolysiloxane, and catalyst, if present. When vinyloximosilane is used as the crosslinker to make a moisture curable gunnable adhesive composition, the amount of vinyloximosilane may range from 1% to 8%, alternatively 2% to 5%, based on the weight of the gunnable adhesive composition.

Catalyst

A catalyst may optionally be used in the gunnable adhesive composition. The catalyst may be omitted, for example when the gunnable adhesive composition is not curable or when the organopolysiloxane and/or the silane crosslinker is present and contains ketoxime functional groups. The catalyst may comprise carboxylic acid salts of metals, ranging from lead to manganese inclusive, in the electromotive series of metals. For example, the catalyst may be a carboxylic acid salt of metal, a tin compound, a titanium compound, or a zirconium compound. Suitable titanium compounds may comprise a chelated titanium compound, a titanate such as a tetraalkoxytitanate, or a combination thereof. Examples of suitable titanium compounds include, but are not limited to, diisopropoxytitanium bis(ethylacetoacetate), tetrabutoxy titanate, tetrabutyltitanate, tetraisopropyltitanate, and bis-(ethoxyacetoacetonate)diisopropoxy titanium (IV), and a combination thereof. Alternatively ingredient the catalyst may comprise a tin compound such as dibutyltin diacetate, dibutyltin dilaurate, dibutyl tin oxide, stannous octoate tin oxide, or a combination thereof. Examples of catalysts are disclosed in U.S. Pat. Nos. 4,962,076; 5,051,455; and 5,053,442.

The amount of catalyst used may range from 0.01 to 2 pph based on the combined amount of silicone resin and organopolysiloxane, alternatively 0.05 to 1 pph. If too much catalyst is added then the cure of composition will be impaired. Additionally, as the amount of catalyst is increased the viscosity of the gunnable adhesive composition may increase, thereby resulting in more force required to apply the material.

Filler

Examples of suitable fillers include precipitated calcium carbonates, fumed silicas, carbon blacks, and combinations thereof; alternatively precipitated calcium carbonate. Suitable precipitated calcium carbonates included Winnofil® SPM from Solvay and Ultrapflex® and Ultrapflex® 100 from SMI. The precipitated calcium carbonate can be surface treated to render the surface hydrophobic, e.g., with fatty acids such as stearic acid. The type and amount of filler may be selected to impart non-slump characteristics to the gunnable adhesive composition, either when the filler is used alone or in conjunction with a rheological modifier such as a Polyvest, described below. The type and amount of filler are also selected to affect extrusion rate, however the amount of filler is selected to not interfere with adhesion, and provide acceptable physical properties to the adhesive product of the gunnable adhesive composition. The exact amount of filler will depend on various factors including the type of filler and surface treatment selected, however, the amount may range from 1% to 50% based on the weight of the composition. Without wishing to be bound by theory, it is thought that the fillers have relatively small particle size and large surface area ratios. The exact particle size will depend on various factors including the type of filler selected, however, mean particle size for precipitated calcium carbonate may range from 0.05 micrometer to 0.15 micrometer, alternatively 0.06 micrometer to 0.08 micrometer. The exact surface area will depend on various factors including the type of filler selected and its mean particle size, however, the surface area for precipitated calcium carbonate may range from 10 $m^2/g$ to 30 $m^2/g$, alternatively 15 $m^2/g$ to 25 $m^2/g$. It is thought that ground fillers such as ground calcium carbonate and ground quartz, without other fillers, may not be suitable to provide the properties desired for the gunnable adhesive composition. However, ground fillers may be used in combination with the fillers described above.

The amount of filler in the gunnable adhesive composition may vary depending on the type of filler selected, however, the filler, such as a suitable precipitated calcium carbonate mentioned above, can be used at an amount ranging from 40% to 50% based on the weight of the gunnable adhesive composition. One skilled in the art would be able to optimize the amount of filler to obtain minimal slump, while still maintaining adhesion and extrusion properties.

Solvent

Solvent may be used in the gunnable adhesive composition. Solvent aids with the flow and introduction of the silicone resin and organopolysiloxane, and solvent helps impart the gunnable character to the gunnable adhesive composition. Solvents used herein are those that help fluidize the components used in producing the gunnable adhesive composition but essentially do not react with any of the components therein. Solvent is selected based on solubility of the silicone resin and other ingredients in the gunnable adhesive composition and volatility. The solubility refers to the solvent being sufficient to dissolve dry silicone resins (described above) and remain single phase with no separation when formulated into the gunnable adhesive composition during the shelf life of the composition. Volatility refers to vapour pressure of the solvent. If the solvent is too volatile (having too high vapour pressure) bubbles may form in the gunnable adhesive composition at the application temperature, and the bubbles may cause cracks or otherwise weaken the adhesive product. However if the solvent is not volatile enough (too low vapour pressure) the solvent may remain as a plasticizer in the adhesive product of the gunnable adhesive composition or the amount of time for the product to develop physical properties may be longer than desired. However, the solvent may have a saturated vapour pressures ranging from 1 to 50, alternatively 3 to 10, mmHg (400 Pa to 1333 Pa) absolute pressure at 25° C. Suitable solvents include octamethyltrisiloxane and xylene. Suitable solvents include organic solvents such as toluene and xylene, and low molecular weight siloxanes such as octamethyltrisiloxane and 0.5 to 1.5 cSt Dow Corning® 200 Fluids and Dow Corning® OS FLUIDS, which are commercially available from Dow Corning Corporation of Midland, Mich., U.S.A. The amount of solvent will depend on various factors including the type of solvent selected and the amount and Mw of the silicone resin selected. However, the amount of solvent may range from 3% to 10%, alternatively 4% to 7%, based on the weight of the gunnable adhesive composition.

The ingredients and their amounts in the gunnable adhesive composition are selected to impart nonslump and extrusion capability to the gunnable adhesive composition. Nonslump means that the gunnable adhesive composition has a slump ranging from 0 mm to 5 mm at a temperature ranging from 0° C. to 100° C. as measured by ASTM C639. Extrusion capability of the gunnable adhesive composition means a minimum of 10 mL/min as measured by ASTM C1183, alternatively 10 to 1000 mL/min, and alternatively 100 to 1000 mL/min. The ingredients and their amounts in the gunnable adhesive composition are selected to impart a peak peel strength to various substrates and a movement capability to the adhesive product prepared by hardening the gunnable adhesive composition. The movement capability is greater than 25%, alternatively movement capability ranges from 25% to 50%, as measured by ASTM C719. Peak peel strength to low energy surfaces and structural substrates is at least 5 pli (875.7 $Nm^{-1}$), alternatively at least 10 pli (1751.3 $Nm^{-1}$), as measured by ASTM C794 as modified in Reference Example 3, described below.

Propellant

Propellant may be added to the package for the gunnable adhesive composition, for example, to aid in dispensing. Suitable propellants include, but are not limited to, carbon dioxide, butane, pentane, heptane, or combinations thereof. The amount added will vary depending on the size of the package and the amount of the gunnable adhesive composition in the package.

Other Optional Ingredients

The gunnable adhesive composition may optionally further comprise 0.05 to 2 pph based on the combined amounts of silicone resin and organopolysiloxane of an adhesion promoter. Adhesion promoters are known in the art and may comprise silanes having the formula $R^5_c R^6_d Si(OR)_{4-(c+d)}$ where $R^5$ is a substituted or unsubstituted, monovalent hydrocarbon group having at least 3 carbon atoms and $R^6$ contains at least one SiC bonded group having an adhesion-promoting group, such as amino, epoxy, mercapto or acrylate groups, c has a value of 0 to 2 and d is either 1 or 2 and the quantity (c+d) is not greater than 3. The adhesion promoter can also be a partial condensate of the above silane.

The gunnable adhesive composition may optionally further comprise a plasticizer. The plasticizer may be added in an amount to replace 0% to 50% of ingredient b) Plasticizers are known in the art and are commercially available. For example a nonreactive polydiorganosiloxane may be used. Examples include polydimethylsiloxane having viscosity ranging from 50 to 50,000 cSt may be used. Such polydimethylsiloxanes are commercially available as Dow Corning® 200 Fluids from Dow Corning Corporation of Midland, Mich., U.S.A. One skilled in the art would recognize that certain solvents may also function as plasticizers, and that the plasticizer may be added instead of a portion of the solvent.

The gunnable adhesive composition may optionally further comprise up to 5%, alternatively 1% to 2% based on the weight of the composition of a rheology modifier other than the filler. Suitable rheology modifiers are known in the art and are commercially available. Examples include polyamides, Polyvest, which is commercially available from Evonk, Disparlon from King Industries, Kevlar Fibre Pulp from Du Pont, Rheospan from Nanocor, and Ircogel from Lubrizol.

Other optional ingredients that may be added to the composition include UV stabilizers such as LowLite from Chemtura, OnCap from PolyOne, Light Stabilizer 210 from Du Pont, and Tinuvin from Ciba; and pigments other than the filler such as titanium dioxide, carbon black Stan-Tone 50SP01 Green (which is commercially available from PolyOne). Representative, non-limiting examples of carbon black include; SUPERJET® Carbon Black (LB-1011) supplied by Elementis Pigments Inc., Fairview Heights, Ill. 62208; SR 511 supplied by Sid Richardson Carbon Co, 3560 W Market Street, Suite 420, Akron, Ohio 44333; and N330, N550, N762, N990 (Degussa Engineered Carbons, Parsippany, N.J. 07054). The amount of pigment added to the gunnable adhesive composition depends on various factors including the other ingredients of the gunnable adhesive composition, however, the amount may range from 0.001% to 20% based on the weight of the gunnable adhesive composition.

The gunnable adhesive composition described above may have the following properties:
a slump ranging from 0 mm to 5 mm at a temperature ranging from 0° C. to 100° C. measured by ASTM C639, and
    an extrusion capability with a minimum of 10 mL/min as measured by ASTM C1183.
The gunnable adhesive composition hardens to an adhesive product. The adhesive product may have the following properties:
    a movement capability per ASTM C719 ranging from +/−5% to +/−50%,
    a peak peel strength to low surface energy substrates and structural substrates of at least 5 pli (875.7 $Nm^{-1}$) as measured by ASTM C794 as modified in Reference Example 3.
The gunnable adhesive composition, which hardens to the adhesive product may comprise:
I) a component selected from a mixture and a reaction product, or a combination thereof of ingredients a) and b), where
    ingredient a) is a silicone resin, and
    ingredient b) is an organopolysiloxane,
where the silicone resin and the organopolysiloxane are added in amounts to provide a R/P ratio ranging from 58% to 64%,
II) a filler,
III) a solvent,
optionally
IV) a silane crosslinker, and
optionally
V) a catalyst;
where the gunnable adhesive composition has
    a slump ranging from 0 mm to 5 mm at a temperature ranging from 0° C. to 100° C. as measured by ASTM C639, and
    an extrusion capability with a minimum of 10 mL/min as measured by ASTM C1183;
and
where the adhesive product has
    a movement capability per ASTM C719 ranging from +/−5% to +/−50%,
    a peak peel strength to low surface energy substrates and structural substrates of at least 5 pli (875.7 $Nm^{-1}$) as measured by ASTM C794 as modified in Reference Example 3. For purposes of this application, the terms "hardens" and "hardening" refer to forming the adhesive product by curing, cooling, and/or devolatilizing to remove solvent from, the gunnable adhesive composition, thereby increasing viscosity.

Production Method

The gunnable adhesive composition may be prepared by any convenient means. For example, the silicone resin, organopolysiloxane, filler, solvent and any other ingredients may be fed into a continuous mixing device, such as a twin screw extruder. The order of addition into the continuous mixing device is not critical to produce the gunnable adhesive composition. However, if the silicone resin has more than 0.7% silanol, it may be desirable to add the silane crosslinker and/or catalyst and silicone resin together to allow for any reaction to take place and the reaction product (volatiles) to be removed. The continuous mixing device should be capable of mixing the ingredients and should include means for removing volatiles. Typically an extrusion device is used and more typically a twin-screw extrusion device is used.

When using an extrusion device the ingredients may be fed into the extruder and may optionally be heated to a temperature ranging from 50° C. to 250° C., alternatively 80° C. to 150° C. By heating the in the extruder, the viscosity may be lowered to improve mixing the ingredients. Typically in the extrusion device, the silicone resin and organopolysiloxane and solvent are fed into the device. The silane crosslinker and catalyst may also be added at this point or they may be added further downstream in the device after some mixing has taken place. The continuous process of hot melt adhesives on a co-rotating twin-screw extruder is described in T. Peitz, "Continuous Processing of Hot Melt Adhesives on Co-Rotating Twin Screw Extruders", 1996 Hot Melt Symposium, p. 37-45.

Some or all of the solvent may be removed and/or replaced during the continuous mixing process. Although the gunnable adhesive composition contains some solvent, the silicone resin may be delivered in a different solvent than the solvent desired in the gunnable adhesive composition exiting the process. For example, the silicone resin may be delivered in xylene. Vacuum may be applied on the continuous mixing device to facilitate removal of the solvent and any other volatile components that may be in the gunnable adhesive composition. Vacuum may be applied in a single or multiple stages on the continuous mixing device. It has been found that the use of multiple vacuum stages provides improved removal to the solvent. Because the silane crosslinker may be volatile, it is preferable to add the silane crosslinker after most of the solvent has been removed to prevent removal of the crosslinker with the solvent. A solvent may also be added after vacuum application, for example, to replace some or all of the solvent that was removed.

Alternatively, the gunnable adhesive composition may be prepared in a batch process. The process may comprise adding the ingredients to a batch mixer and mixing and optionally heating the ingredients to a temperature ranging from 50° C. to 250° C., alternatively 80° C. to 150° C. The order of addition is not specifically restricted, however, when used, the crosslinker and catalyst may be added after i) mixing the silicone resin and the polyorganosiloxane in the presence of solvent and ii) thereafter removing all or a portion of the solvent. A different solvent may then be added after step ii) and before or after adding the crosslinker and/or catalyst. However, solvent removal is optional, and may be omitted, for example, when the silicone resin is supplied in the type and amount of solvent desired in the gunnable adhesive composition.

Methods of Use

The gunnable adhesive composition may be used for gap filling applications. Alternatively, the gunnable adhesive composition may be used for seal applications, such as sealing the edge of a lap joint in a construction membrane or seal penetration, e.g., sealing a vent in a construction membrane. Alternatively, the gunnable adhesive composition can be used to adhere at least two substrates together. The gunnable adhesive composition may be used as a layer between the two substrates to produce a laminate of the first substrate, the adhesive product (i.e., prepared by cooling and/or curing the gunnable adhesive composition) and the second substrate. The laminate structure produced herein is not limited to these three layers. Additional layers of cured adhesive and substrate may be applied. The layer of gunnable adhesive composition in the laminate may be continuous or discontinuous. For example, a continuous layer may be used to form a laminate a such as the portion of the wall 100 shown below in FIG. 1. In FIG. 1, a weather barrier 101 is between an interior wall 102 and a brick exterior wall 103.

Further there is no limitation on the material that may be used as the substrate. Suitable substrates to which the gunnable adhesive composition, or adhesive product thereof, may be applied include, but are not limited to, glass; concrete; brick; stucco; metals, such as aluminium, copper, gold, nickel, silicon, silver, stainless steel alloys, and titanium; ceramic materials; plastics including engineered plastics such as epoxies, polycarbonates, poly(butylene terephthalate) resins, polyamide resins and blends thereof, such as blends of polyamide resins with syndiotactic polystyrene such as those commercially available from The Dow Chemical Company, of Midland, Mich., U.S.A., acrylonitrile-butadiene-styrenes, styrene-modified poly(phenylene oxides), poly(phenylene sulfides), vinyl esters, polyphthalamides, and polyimides; cellulosic substrates such as paper, fabric, and wood; and combinations thereof. When more than one substrate will be used, there is no requirement for the substrates to be made of the same material. For example, it is possible to form a laminate of plastic and metal substrates or wood and plastic substrates.

The gunnable adhesive composition and adhesive product made therefrom may be used to adhere a construction membrane to a structure. A method for adhering a construction membrane to a structure comprises:

I) applying a gunnable adhesive composition as described above to a first substrate, II) hardening the gunnable adhesive composition to form an adhesive product, and III) adhering the first substrate to a second substrate through the adhesive product.

The first substrate may be the construction membrane, and the second substrate may be the structure. Alternatively, the first substrate may be the structure, and the second substrate may be the construction membrane. Alternatively, the first substrate and the second substrate may each be a construction membrane, with the proviso that the first substrate and the second substrate may be the same or different construction membranes.

Construction Membranes

Examples of suitable construction membranes may comprise synthetic rubbers and plastics, alternatively plastics, and alternatively low surface energy plastics. Synthetic rubbers include polychloroprene, butyl rubber, regenerated cellulose, cellulose ethers, or cellulose esters. Plastics include polyamides, polyesters (e.g., polyethylene terephthalate), polyurethanes, polyolefins, e.g., polyethylene, polypropylene, polybutene, polyisobutylene, polybutadiene, and combinations thereof; and halogenated polyolefins, e.g., polytetrafluoroethylene (PTFE), polyvinyl chloride (PVC), a copolymer of vinyl chloride and vinylidene chloride, and combinations thereof; and alternatively polyethylene. Suitable substrates include commercially available building wraps, such as Tyvek® HomeWrap®, Tyvek® StuccoWrap®, Tyvek® CommercialWrap®, Tyvek® CommercialWrap® D, Tyvek® DrainWrap™, Tyvek® ThermaWrap™, Tyvek® AtticWrap™, DuPont™ FlexWrap™, DuPont™ FlexWrap™ NF, DuPont™ StraightFlash™, DuPont™ StraightFlash™ VF, DuPont™ Flashing Tape, DuPont™ Thru-Wall Flashing, Tyvek® Tape, Tyvek® Wrap Caps; all of which are commercially available from E.I. DuPont de Nemours of Wilmington, Del., U.S.A. Another suitable building wrap is Perm-a-Barrier® and Bituthene® from W.R. Grace of W.R. Grace & Co. Conn. of Cambridge, Mass., U.S.A.

One skilled in the art would recognize that the above construction membranes are exemplary and not limiting. For example, other suitable construction membranes having similar low surface energies are commercially available from Henry Company of El Segundo, Calif., U.S.A. and Carlisle of Wylie, Tex., U.S.A.

The gunnable adhesive composition, and adhesive product thereof, is useful for adhering construction membranes in various barrier applications. For example, the gunnable adhesive composition may be used in laminated sill wrap assemblies such as those described in U.S. Pat. No. 5,091,235 and U.S. Published Patent Application 2001/0034984; barrier sheet materials for exterior wall constructions such as those described in U.S. Pat. Nos. 3,900,102 and 6,355,333; window and wall assemblies such as those described in U.S. Published Patent Application 2003/0041537 and PCT Publication WO2008/048763; and flashing systems such as those described in U.S. Pat. No. 6,401,402.

Articles of Manufacture

For example, the gunnable adhesive composition may be used to prepare a barrier. The barrier may comprise:
I) a building wrap, and
II) a film of a gunnable adhesive composition on a surface of the building wrap, where the gunnable adhesive composition comprises:
  i) a component selected from a mixture and a reaction product, or a combination thereof of ingredients a) and b), where
    ingredient a) is a silicone resin, and
    ingredient b) is an organopolysiloxane,
where the silicone resin and the organopolysiloxane are added in amounts to provide a R/P ratio ranging from 58% to 64%,
  ii) a filler,
  iii) a solvent,
  optionally
  iv) a silane crosslinker,
  optionally
  v) a catalyst.

The barrier may be prepared such that ingredient a) has a number average molecular weight greater than 3,000, and ingredient b) has a viscosity ranging from 0.02 Pa·s to 100 Pa·s at 25° C. In this barrier, the gunnable adhesive composition may optionally further comprises an ingredient selected from: a propellant, an adhesion promoter, a plasticizer, and a rheology modifier. Ingredient I) may be a building wrap described above. Alternatively, ingredient I) may comprise a polyolefin, a halogenated polyolefin, or a combination thereof.

The barrier may be used in a structure. The barrier described above may be adhered to a surface of the structure. The barrier may be a sill wrap, a wall barrier sheet, a flooring barrier, or an Exterior Insulation Finishing System (EIFS).

This invention further relates to a building comprising:
I) a structure, and
II) a film of an adhesive product, where the adhesive product is prepared by curing and/or cooling a gunnable adhesive composition, where the gunnable adhesive composition comprises:
  i) a component selected from a mixture and a reaction product, or a combination thereof of ingredients a) and b), where
    ingredient a) is a silicone resin, and
    ingredient b) is an organopolysiloxane,
where the silicone resin and the organopolysiloxane are added in amounts to provide a R/P ratio ranging from 58% to 64%,
  ii) a filler,
  iii) a solvent,
  optionally
  iv) a silane crosslinker,
  optionally
  v) a catalyst; and
III) a building wrap, where the building wrap is adhered to the structure through the adhesive product.

In the building described above, ingredient a) may have a weight average molecular weight greater than 3,000, and ingredient b) has a viscosity ranging from 0.02 Pa·s to 100 Pa·s at 25° C. The gunnable adhesive composition may further comprise an ingredient selected from: an adhesion promoter, a plasticizer, and a rheology modifier. Ingredient III) may be any of the building wraps may be a building wrap described above. Alternatively, ingredient III) may comprise a polyolefin, a halogenated polyolefin, or a combination thereof.

EXAMPLES

These examples are intended to illustrate the invention to one of ordinary skill in the art and should not be interpreted to limit the scope of the invention set forth in the claims. In this application, all amounts, ratios, and percentages are by weight unless otherwise indicated. All viscosity measurements are taken at 25° C. unless otherwise stated.

Reference Example 1

Peel Strength Testing

Peel testing was accomplished by adapting standard test method ASTM C794 "Adhesion in peel of elastomeric joint sealants" as follows. A testing plate was formed by fastening a sheet of the substrate to a stiff plate that will exhibit minimum bending or deflection upon conducting the test. A bead of gunnable adhesive composition was laid in dimensions of 0.25 inch (in) (0.635 cm) by 4 in (10.16 cm) onto the substrate on the plate. An aluminium screen measuring 0.5 in (1.27 cm) by 10 in (25.4 cm) was prepared in advance by washing in isopropanol (IPA), optionally priming with a primer described in the examples below, and allowing to dry at least 4 hrs at standard conditions of temperature and humidity. The prepared aluminium screen was applied to the bead and pushed into the bead such the entire area under the screen was filled with gunnable adhesive composition. To the top of the screen, a second bead of gunnable adhesive composition was applied similar to the first. A tool measuring 0.25 in (0.635 cm) by 0.5 in (1.27 cm) was used to spread the gunnable adhesive composition over the screen and profile the gunnable adhesive composition/screen specimen to the desired shape and thickness. Excess gunnable adhesive composition was scraped from the testing area and removed. The specimens were then left at specified conditions to cure, normally 70° F. (21.1° C.) and 50% Relative humidity (RH) for a specified length of time, typically 7, 14, 21, or 28 days. After the specified conditioning cycle was complete, the specimen was pulled in a tensometer.

The specimen was clamped in a tensometer such that the testing plate was clamped in one end, and the excess screen was clamped in the other. The specimen was oriented so that when pulled, the direction of the peel was 180 degrees from the initial flat screen, i.e., peeling back the specimen with the screen. The specimen was pulled typically 1 inch (2.54 cm) of distance with a pull rate of 2 in/min (5.08 cm/min). The load transducer measured the force applied required to peel the samples and calculated values were made from this force and other factors such as sample width or length, e.g., max peel force=max load/samples width. Sample peel strength along with failure mode were recorded.

Reference Example 2

Lap Shear Testing

Lap shear testing was accomplished by adapting standard test method ASTM C961 "Lap Shear Strength of Sealants" as follows. A specimen for testing was constructed by cutting strips of substrate measuring 1 inch by 4 inch (2.54 cm×10.16 cm). A mark was made at the end of one strip 1 in (2.54 cm) from the end so that there is a 1 in×1 in square (2.54 cm×25.4 cm square) available for bonding. A small amount of gunnable adhesive composition was applied in the 1 in square (2.54 cm square), enough to fill the void from an overlapping substrate when compressed. The second substrate was placed on the gunnable adhesive composition, inline, with tails 180° apart, so that there is a 1 inch square bonded together and 2 tails left apart in which to later pull. Two shims, each having a thickness of 60 mils (0.152 cm), were placed on either side of the specimen. A flat plat was held to the 2 shims and moved forward along the sample, pushing excess gunnable adhesive composition out of the bond gap and setting the bond gap even. The shims were removed and excess gunnable adhesive composition was gently removed from the bond gap with a small spatula. The samples were placed on a release liner and allowed to cure for the specified time, temp, and moisture conditions.

After the designated cure condition were met, the sample tails were clamped in a tensometer. The specimen was oriented so that when pulled, the adhesive product would be exposed to a shear force generated by moving substrates that are parallel in alignment. The specimen was pulled typically at 1 inch (2.54 cm) of distance with a pull rate of 0.5 in/min (1.27 cm/min). The load transducer measured the force applied force required to separate the samples. In this case, maximum sample lap shear strength, along with failure mode (adhesive failure, cohesive failure, substrate failure) were recorded.

Reference Example 3

Peel strength testing was performed according to a modified ASTM C794 180° Peel Adhesion test. In this test, each substrate was cleaned with isopropanol (IPA wipe) and allowed to dry. The compositions to be tested were applied to the substrates using a draw-down technique and appropriate shims (drawdown bar) to create ¹⁄₁₆ in (0.159 cm). thick line. Strips of (20 count) aluminium mesh 0.5 in (1.27 cm) wide screen were cleaned with xylene and primed with DOW CORNING® DC 1200 red primer available from Dow Corning Corporation of Midland, Mich., U.S.A. The cleaned screens were laid on top of each composition. A second layer of composition was applied to peel using appropriate shims (drawdown bar) to create another ¹⁄₁₆ in. (0.159 cm) thick line. The resulting specimens were then cured and evaluated. The first set of specimens were cured by being left at standard conditions (70° F. (21.1° C.) and 50% RH) for 7 days. Peak peel strength was measured on 3 specimens and an average value for pli and % cohesive failure were recorded. Additional specimens that were first left at the ambient conditions as described above, were then submerged in water for one day and for seven days and were also evaluated.

Specimens were evaluated after cure time elapsed by scoring peel down the entire length (both sides) of the screen. Specimens were peeled by hand and then scored. Samples were pulled on a tensometer (Instron or MTS Alliance RT/5), at a rate of 2 inches/min (5.08 cm/min). An average peak stress was recorded to give an indication of tensile and adhesive strength. The amount of cohesive failure was also recorded.

Comparative Example 1

A gunnable adhesive composition was prepared by mixing the following ingredients:
a) 41.4% silicone resin with trimethylsiloxane treatment;
b) 19.5% hydroxyl terminated, dimethylsiloxane polymer, with a viscosity of 50,000 cP (mPa·s);
c) 26.1% stearic acid treated ground calcium carbonate;
d) 8.7% $(CH_3)_3SiOSi(CH_3)_2OSi(CH_3)_3$; and
e) 4.4% vinyltrioximinosilane.

The gunnable adhesive composition was applied to four low energy substrates and cured at ambient temperature to form adhesive products on the substrates. Peak peel strength was measured for each substrate according to the test method in Reference Example 1. The results are in Tables 1 and 2. The four substrates were: Tyvek® CommercialWrap®, Tyvek® CommercialWrap® D, DuPont™ FlexWrap™, and DuPont™ FlexWrap™ NF; all of which are commercially available from DuPont of Wilmington, Del., U.S.A. Comparative example 1 has adhesion, but does not have the non-slump character due to the presence of ground calcium carbonate as the only filler.

Comparative Examples 2-13

Conventional Sealants

Various sealants commercially available from Dow Corning Corporation of Midland, Mich., U.S.A. were applied to the same low energy substrates as in example 1. The sealants were applied after a primer (primed) or without a primer (unprimed). The sealants were cured at ambient temperature to form adhesive products on the substrates. Peak peel strength was measured for each substrate according to the test method in Reference Example 1. The results are in Tables 1 and 2.

Comparative Examples 14 and 15

Hot Melt Adhesive Composition

A hot melt adhesive composition, InstantGlaze®, which is commercially available from Dow Corning Corporation of Midland, Mich., U.S.A. was applied to the same low energy substrates as in example 1. The hot melt adhesive composition was applied after a primer (primed) or without a primer (unprimed). The hot melt adhesive composition samples were cured at ambient temperature to form adhesive products on the substrates. Peak peel strength was measured for each substrate according to the test method in Reference Example 1. The results are in Tables 1 and 2.

TABLE 1

| Commercial Wrap D (substrate) | peak pli (Nm$^{-1}$) | Commercial Wrap (substrate) | peak pli (Nm$^{-1}$) |
|---|---|---|---|
| C. Ex. 1 | 12.8 (2241.7) | Example 1 | 20.2 (3537.6) |
| C. Ex. 2 1199 primed | 2.1 (367.8) | 1199 primed | 5.7 (998.2) |
| C. Ex. 3 1199 unprimed | 0.5 (87.6) | 1199 unprimed | 0.6 (105.1) |
| C. Ex. 4 3-0117 primed | 2.5 (437.8) | 3-0117 primed | 0.5 (87.6) |
| C. Ex. 5 3-0117 unprimed | 0.1 (17.5) | 3-0117 unprimed | 0.0 |
| C. Ex. 6 756 primed | 0.9 (157.6) | 756 primed | 2.9 (507.9) |
| C. Ex. 7 756 unprimed | 4.0 (700.5) | 756 unprimed | 2.4 (420.3) |
| C. Ex. 8 790 primed | 2.5 (437.8) | 790 Primed | 1.3 (227.7) |
| C. Ex. 9 790 unprimed | 1.0 (175.1) | 790 unprimed | 1.5 (262.7) |
| C. Ex. 10 795 primed | 2.0 (350.3) | 795 primed | 0.3 (52.5) |
| C. Ex. 11 795 unprimed | 0.3 (52.5) | 795 unprimed | 0.3 (52.5) |
| C. Ex. 12 9-1374 primed | 2.5 (437.8) | 9-1374 primed | 0.5 (87.6) |
| C. Ex. 13 9-1374 unprimed | 0.6 (105.1) | 9-1374 unprimed | 1.5 (262.7) |
| C. Ex. 14 InstantGlaze primed | 16.8 (2942.2) | InstantGlaze primed | 23.3 (4080.5) |
| C. Ex. 15 InstantGlaze Unprimed | 15.6 (2732.0) | InstantGlaze unprimed | 24.1 (4220.6) |

The unprimed adhesive product prepared by curing the gunnable adhesive composition in example 1 provided better peak peel strength than all of the commercially available sealants, regardless of whether primer was applied, to all of the substrates tested in these examples. The adhesive product prepared by curing the gunnable adhesive composition in example 1 provided better peak peel strength than commercially available InstantGlaze® (both primed and unprimed) on the DuPont™ FlexWrap™ substrate. The adhesive product prepared by curing the gunnable adhesive composition in example 1 provided comparable peak peel strength to the peel strengths of primed and unprimed InstantGlaze® on the remaining substrates, however, InstantGlaze® suffers from the drawback of requiring heat for application, which is undesirable to the customer for certain applications, such as building wrap.

Examples 2-17

Samples of gunnable adhesive compositions in Examples 2 to 17 were prepared by mixing the ingredients in Table 3. Amounts of each ingredient were parts by weight. Filler 1 was CS-11 stearic acid treated ground calcium carbonate filler. Filler 2 was M7D untreated fumed silica having 200 m$^2$/g surface area. Filler 3 was Winnofil SPM reinforcing precipitated calcium carbonate filler. Filler 4 was L90 untreated fumed silica having 100 m$^2$/g surface area. Filler 5 was Thixocarb500 reinforcing precipitated calcium carbonate filler. Resin 1 was silicone resin with trimethylsiloxane treatment. Polymer 1 was hydroxyl terminated, dimethylsiloxane polymer, with a viscosity of 50,000 cP (mPa·s). Polymer 2 was dimethyl silicone polymer with silanol termination having viscosity of 50,000 cP (mPa·s). Crosslinker 1 was vinyltrioximinosilane. Crosslinker 2 methyloximinosilane. Solvent 1 was octamethyltrisiloxane. Plasticizer 1 was a dimethyl silicone polymer with trimethylsilyl termination having viscosity of 100 cSt.

TABLE 2

| Flexwrap (substrate) | peak pli (Nm$^{-1}$) | Flexwrap NF (substrate) | peak pli (Nm$^{-1}$) |
|---|---|---|---|
| C. Ex. 1 | 22.6 (3957.9) | Example 1 | 27.0 (4728.5) |
| C. Ex. 2 1199 Primed 0% CF | 0.6 (105.1) | 1199 Primed 0% CF | 0.6 (105.1) |
| C. Ex. 3 1199 Unprimed 0% CF | 0.7 (122.6) | 1199 Unprimed 0% CF | 0.2 (35.0) |
| C. Ex. 4 3-0117 Primed 0% CF | 2.0 (350.3) | 3-0117 Primed 0% CF | 0.2 ((35.0) |
| C. Ex. 5 3-0117 Unprimed 0% CF | 4.8 (840.6) | 3-0117 Unprimed 0% CF | 0.8 (140.1) |
| C. Ex. 6 756 Primed 0% CF | 1.6 (280.2) | 756 Primed 0% CF | 8.3 (1453.6) |
| C. Ex. 7 756 Unprimed 0% CF | 0.9 (157.6) | 756 Unprimed 0% CF | 6.7 (1173.4) |
| C. Ex. 8 790 Primed 0% CF | 1.7 (297.7) | 790 Primed 0% CF | 6.2 (1085.8) |
| C. Ex. 9 790 Unprimed 0% CF | 0.9 (157.6) | 790 Unprimed 0% CF | 1.9 (332.7) |
| C. Ex. 10 795 Primed 0% CF | 0.4 (70.1) | 795 Primed 0% CF | 4.9 (858.1) |
| C. Ex. 11 795 Unprimed 0% CF | 0.6 (105.1) | 795 Unprimed 0% CF | 3.3 (577.9) |
| C. Ex. 12 9-1374 Primed 0% CF | 2.0 (350.3) | 9-1374 Primed 0% CF | 6.2 (1085.8) |
| C. Ex. 13 9-1374 Unprimed 0% CF | 1.0 (175.1) | 9-1374 Unprimed 0% CF | 0.2 (35.0) |
| C. Ex. 14 IG Primed_Material Failure | 13.3 (2329.2) | IG Primed 0% CF | 34.3 (6007.0) |
| C. Ex. 15 IG Unprimed 100% CF_Material Failure | 18.0 (3152.3) | IG Unprimed 100% CF_Material Failure | 37.2 (6514.8) |

The samples were evaluated according to the test method in Reference Example 2. The results are in Table 4.

Comparative Examples 16-28

Samples of commercially available products from Dow Corning Corporation of Midland, Mich., U.S.A. were evaluated using the test method of Reference Example 2. The results are in Table 5 below.

Examples 18-19 and Comparative Examples 29-37

Examples 18 and 19 were prepared by mixing the ingredients in Table 6. Polymer 3 was hydroxyl terminated polydimethylsiloxane viscosity of 50,000 cSt. Plasticizer 1 was trimethylsiloxy-terminated polydimethylsiloxane having viscosity of 100 cSt and commercially available as DOW CORNING® 200 Fluid from Dow Corning Corporation of Midland, Mich., U.S.A. Solvent 1 was trimethylsiloxy-terminated polydimethylsiloxane having viscosity of 1 cSt and commercially available as DOW CORNING® 200 Fluid from Dow Corning Corporation of Midland, Mich., U.S.A. Tackifying Resin 1 was 70% of a trimethyl endcapped MQ resin in 30% solvent. Tackifying Resin 1 had Mw of 4,000 to 9,000 and M/Q ratio of 0.9 to 1.1. Crosslinker 1 was vinyltri-oximinosilane. Filler 3 was Winnofil SPM reinforcing precipitated calcium carbonate filler. Resin 1 was trimethyl endcapped MQ resin with Mw of 14,000 to 19,000.

Samples of commercially available products were evaluated for comparative examples 29-36. The products were as follows. Comparative example 29 was DOW CORNING® 790, which was applied to the substrate without primer. Comparative example 30 was DOW CORNING® 756, which was applied to the substrate without primer. Comparative example 31 was DOW CORNING® 795, which was applied to the substrate without primer. Each of these products is commercially available from Dow Corning Corporation of Midland, Mich., U.S.A.

Comparative example 32 was HENRY 925 BES, which is commercially available from Henry Company of El Segundo, Calif., U.S.A.

Comparative example 33 was DOW CORNING® 757, which is commercially available from Dow Corning Corporation of Midland, Mich., U.S.A.

Comparative example 34 was Tremflex 834, comparative example 35 was Vulkem® 116, comparative example 36 was CCW-704, and comparative example 37 was Trempro/Vulkem® 626, all of which are commercially available from Tremco Commercial Sealants & Waterproofing of Beachwood, Ohio, U.S.A.

The samples were applied to various low surface energy substrates and cured under the conditions in Reference Example 3. The substrates were as follows.

LDPE was low density polyethylene. HDPE was high density poly ethylene. TEFLON was polytetrafluoroethylene commercially available from Du Pont. PP was polypropylene. REISS RUBBER was a moulded peroxide cured silicone rubber with a durometer of 50 available from Reiss Manufacturing of Blackstone, Va. FRC was fibre reinforced concrete. BLACK DURANAR was black polyvinylidene fluoride paint on aluminium, paint code UC 40577 made by PPG Industries of Pittsburgh, Pa. SSSS DURANAR was sunstorm silversmith paint on aluminium, also from PPG Industries. SA CONC was small aggregate concrete. LA CONC was large aggregate concrete. GALV STEEL was galvanized steel. ANDERSON VINYL was vinyl extrusion from Anderson Windows of Bayport, Minn. BROWN VINYL was a vinyl extrusion for window applications. TREATED PINE was pressure treated pine for exterior applications. DOUGLAS FIR was stained fir for exterior applications. ANODIZED AL was anodized aluminium. GLASS was ¼ inch (0.635 cm) thick clear float glass. PVC was polyvinylchloride. GRANITE was granite. POWDER COAT was polyester powder paint on aluminium. PAINTED AL was aluminium painted with DURACRON paint from PPG Industries. OSB was oriented strand board. WOOD COMPOSITE was a low surface energy wood flour reinforced polyethylene decking.

DP COMM WRAP D was Tyvek® CommercialWrap® D, DP FLASHING TAPE was DuPont™ Flashing Tape, DP FLEX WRAP was DuPont™ FlexWrap™, and DP FLEX-WRAP NF was DuPont™ FlexWrap™ NF, all of which are commercially available from E.I. du Pont de Nemours of Wilmington Del., U.S.A. It is thought that the DP Flash was corona treated before application of the gunnable adhesive composition (because the Flashing Tape had printing on its surface), and the other du Pont low surface energy substrates were not surface treated. Without wishing to be bound by theory, it is thought that the surface treatment will improve adhesion to various compositions initially, however, the surface treatment will become ineffective after a period of time that varies with the type of treatment and substrate.

GRACE WALL FLASH was Perm-a-barrier Wall Flashing available from W.R. Grace of W.R. Grace & Co. Conn. of Cambridge, Mass., U.S.A.

CARLISLE CCW-705 was CCW-705 Air & Vapour Barrier from Carlisle of Wylie, Tex., U.S.A.

HENRY BS was BlueSkin, Henry B S S A was BlueSkin S A, Henry B S SALT was BlueSkin Self Adhesive Low Temp, and Henry B S TWF was BlueSkin Thru Wall Flashing, all of which are self-adhesive air/vapour barrier membranes, which are commercially available from Henry Company of El Segundo, Calif., U.S.A.

PW BT25XL was Protecto Wrap Butyl Hybrid 25XL Building Tape, PW PS 45 FOIL FACE was Protecto Shield 45 Foil Face, PW SUPERSTICK was Protecto Wrap Super Stick Building Tape, and PW SAFE SEAL was Protecto Wrap Safe Seal, all of which are commercially available from Protecto Wrap Company of Denver, Colo., U.S.A.

The resulting specimens were then evaluated by the method of Reference Example 3. Peak peel strength was measured for each substrate according to the test method in Reference Example 3. Each sample on each substrate was tested three times and the average result for peak pli and % cohesive failure were calculated. Each sample was assigned a score of 0 (for average pli less than 10) or 1 (for average pli greater than 10). The scores were then averaged for each specimen, and the average was multiplied by 10 to calculate a ranking. (On the scale, 0 represents worst adhesion, and 10 represents best adhesion to the most substrates.) The results are in Table 7. For the products and substrates tested, example 19 had the best adhesion to the most substrates as compared to any other product.

Peak peel strength (pli) and % cohesive failure for three low surface energy substrates commonly used in construction applications were also compared for these specimens. Results are in Tables 8-10, and are an average of three test results for each sample. These results show that examples 18 and 19 had better adhesion to low surface energy substrates than any of the commercially available products in comparative examples 29-37.

Example 20

A gunnable adhesive composition was prepared by mixing the ingredients in the amounts listed below.

| Amounts are in weight parts. | |
| --- | --- |
| Resin 1 | 0.2342 |
| Polymer 1 - hydroxyl terminated, dimethylsiloxane polymer, with a viscosity of 50,000 cP (mPa·s) | 0.1914 |
| Filler 6 - stearic acid treated precipitated calcium carbonate | 0.4736 |
| Crosslinker 1 - vinyloximimosilane | 0.0158 |
| Solvent 1 - octamethyltrisiloxane | 0.0595 |
| Tackifying Resin 1 | 0.0256 |

Slump measured by ASTM C639 was 2.5 mm and extrusion capability was 120.3 g/min. The extrusion capability was measured using a ⅛" (0.32 cm) nozzle with a gun pressure of 90 psi (621×10³ Pa), and the result is in g/min, and this indicated that the gunnable adhesive composition had an extrusion capability greater than 10 mL/min as measured by ASTM C1183.

The gunnable adhesive composition was cured by exposure to ambient conditions for 21 days. The adhesive product had movement capability per ASTM C719 of 50% on Glass and Anodized aluminium substrates. The adhesive product had peel adhesion on PTFE of 32.7 pli (5726.8 Nm$^{-1}$), on LDPE of 24.0 pli (4203.1 Nm$^{-1}$), on HDPE of 24.0 pli (4203.1 Nm$^{-1}$), and on PP of 26.7 pli (4676.0 Nm$^{-1}$).

TABLE 3

| | Example | | | | | | | | | | | | | | | |
| --- | --- | --- | --- | --- | --- | --- | --- | --- | --- | --- | --- | --- | --- | --- | --- | --- |
| | 2 | 3 | 4 | 5 | 6 | 7 | 8 | 9 | 10 | 11 | 12 | 13 | 14 | 15 | 16 | 17 |
| Filler 1 | 26.09 | — | 25 | 25 | 25 | 25 | — | — | — | — | — | — | — | — | — | — |
| Filler 2 | 6 | — | 5 | 5 | 5 | 5 | 5 | — | — | — | 7.5 | — | 7.5 | — | 7.5 | 7.5 |
| Resin 1 | 41.39 | 40.8 | 40.8 | 40.8 | 39 | 37.2 | 40.8 | 37.2 | 37.2 | 37.2 | 37.2 | 37.2 | 37.2 | 37.2 | 37.2 | 37.2 |
| Polymer 1 | 19.48 | 19.2 | 19.2 | — | 21 | 22.8 | 19.2 | — | — | — | — | — | — | — | — | 20 |
| Crosslinker 1 | 4.35 | 2.5 | — | 2.5 | 2.5 | 2.5 | 2.5 | — | — | — | — | 2.5 | 2.5 | 2.5 | 2.5 | 2.5 |
| Solvent 1 | 8.7 | 7.5 | 7.5 | 7.5 | 7.5 | 7.5 | 7.5 | 7.5 | 7.5 | 7.5 | 7.5 | 7.5 | 7.5 | 7.5 | 7.5 | 7.5 |
| Filler 3 | — | 30 | — | — | — | — | — | 55 | — | — | — | 56 | — | 56 | — | — |
| Crosslinker 2 | — | — | 2.5 | — | — | — | — | 2.5 | 2.5 | 2.5 | 2.5 | — | — | — | — | — |
| Polymer 2 | — | — | — | 19.2 | — | — | — | 22.8 | 22.8 | 17.5 | 17.5 | 17.5 | 17.5 | 20 | 20 | — |
| Plasticizer 1 | — | — | — | — | — | — | — | 5 | 5 | 5 | 5 | 5 | 5 | 2.5 | 2.5 | 2.5 |
| Filler 4 | — | — | — | — | — | — | — | — | 13 | — | — | — | — | — | — | — |
| Filler 5 | — | — | — | — | — | — | — | — | — | 56 | — | — | — | — | — | — |

TABLE 4

(RESULTS OBTAINED WHEN APPLIED TO A COMMERCIAL WRAP SUBSTRATE)

| Example | Cure Cond | # Samples pulled | Peak Stress, psi (×10³ Pa) | Peak Load, lbf (N) | % Strain at peak | Failure mode |
| --- | --- | --- | --- | --- | --- | --- |
| 2 | 14 d RT | 2 | 43 (296) | 43.033 (191) | 54.7 | pt, pt |
| 3 | 14 d RT | 2 | 41.5 (286) | 41.512 (185) | 33.138 | pt, pt |
| 4 | 14 d RT | 2 | 40 (276) | 40.02 (178) | 31.68 | pt, pt |
| 5 | 14 d RT | 2 | 42.8 (295) | 42.826 (190) | 33.753 | pt, pt |
| 6 | 14 d RT | 2 | 35.6 (245) | 35.552 (158) | 28.03 | pt, pt |
| 7 | 14 d RT | 2 | 41.2 (284) | 41.226 (183) | 36.084 | pt, pt |
| 8 | 14 d RT | 2 | 47.9 (330) | 47.888 (213) | 42.06 | pt, pt |
| 9 | 14 d RT | 3 | | 46.34 (206) | | af, af, af |
| 10 | 14 d RT | 3 | | 46.85 (208) | | af, af, af |
| 11 | 14 d RT | 3 | | 49.7 (221) | | pt, pt, pt |
| 12 | 14 d RT | 3 | | 46.17 (205) | | pt, pt, pt |
| 13 | 14 d RT | 3 | | 48.72 (217) | | pt, pt, pt |
| 14 | 14 d RT | 3 | | 45.53 (203) | | pt/af, pt/af, pt/af |
| 15 | 14 d RT | 3 | | 44.74 (199) | | pt, pt, pt |
| 16 | 14 d RT | 3 | | 50.26 (224) | | pt, pt, pt |
| 17 | 14 d RT | 3 | | 42.53 (189) | | pt, pt, pt |

The abbreviations in the table are defined as follows: 14 d means fourteen days; RT means room temperature; of means adhesive failure; cf means cohesive failure; pt means paper tear, indicating that the substrate failed; and commercial wrap means Tyvek® CommercialWrap®, which is commercially available from DuPont of Wilmington, Del., U.S.A.

TABLE 5

(RESULTS OBTAINED WHEN APPLIED TO A COMMERCIAL WRAP SUBSTRATE)

| Comparative Example | DCC Product | Cure Cond | # Samples Pulled | Peak Stress, psi (×10³ Pa) | Peak Load, lbf (N) | % Strain at peak | Failure Mode |
| --- | --- | --- | --- | --- | --- | --- | --- |
| 16 | 3-0117 unprimed | 14 d RT | 3 | 9.9 (68.3) | 15.467 (68.8) | 14.728 | af |
| 17 | 9-1374 primed | 14 d RT | 3 | 8.7 (60) | 8.715 (38.8) | 6.903 | af |
| 18 | 9-1374 unprimed | 14 d RT | 3 | 10 (69) | 9.967 (44.3) | 9.59 | af |
| 19 | 756 primed | 14 d RT | 3 | 28.2 (194.4) | 28.175 (125.3) | 22.893 | af |

TABLE 5-continued (RESULTS OBTAINED WHEN APPLIED TO A COMMERCIAL WRAP SUBSTRATE)

| Comparative Example | DCC Product | Cure Cond | # Samples Pulled | Peak Stress, psi (×10³ Pa) | Peak Load, lbf (N) | % Strain at peak | Failure Mode |
|---|---|---|---|---|---|---|---|
| 20 | 756 unprimed | 14 d RT | 3 | 14.1 (97.2) | 14.134 (62.9) | 27.441 | af |
| 21 | 790 primed | 14 d RT | 3 | 10.5 (72.4) | 10.453 (46.5) | 12.239 | af |
| 22 | 790 unprimed | 14 d RT | 3 | 15.1 (104.1) | 15.136 (67.3) | 21.433 | af |
| 23 | 795 primed | 14 d RT | 3 | 11.3 (77.9) | 11.336 (50.4) | 7.31 | af |
| 24 | 795 unprimed | 14 d RT | 3 | 13.6 (93.8) | 13.644 (60.7) | 15.132 | af* |
| 25 | 1199 primed | 14 d RT | 3 | 6.5 (44.8) | 6.502 (28.9) | 4.676 | Af |
| 26 | Instantglaze unprimed | 14 d RT | 3 | 35.8 (246.8) | 35.805 (159.3) | 66.161 | af, af, pt |
| 27 | Instantglaze Primed | 21 d RT | 3 | 33.3 (229.6) | 33.341 (148.3) | 65.73 | af, pt, pt |
| 28 | 1199 unprimed | 21 d RT | 3 | 13 (89.6) | 13.02 (57.9) | 10.83 | af |

The abbreviations in the table are defined as follows: 14 d means fourteen days; RT means room temperature; of means adhesive failure; cf means cohesive failure; pt means paper tear, indicating that the substrate failed; and commercial wrap means Tyvek® CommercialWrap®, which is commercially available from DuPont of Wilmington, Del., U.S.A.; * means only two samples were tested; the third was not recorded.

TABLE 6

INGREDIENTS FOR EXAMPLES 18 AND 19

| Example | Resin 1 | Polymer 3 | Crosslinker 1 | Tackifying Resin 1 | Plasticizer 1 | Solvent 1 | Filler 3 |
|---|---|---|---|---|---|---|---|
| 18 | 0 | 13 | 2.1 | 34 | 1.6 | 4.9 | 44 |
| 19 | 17 | 14 | 2.1 | 18 | 1.7 | 5.1 | 43 |

In the following Table 7, '-' means value for pli was not recorded.

TABLE 7

RESULTS OF EXAMPLES 18 AND 19 AND COMPARATIVE EXAMPLES 29-37

| | Example | | | | | | | | | | |
|---|---|---|---|---|---|---|---|---|---|---|---|
| | 18 | 19 | c29 | c30 | c31 | c32 | c33 | c34 | c35 | c36 | c37 |
| RATING | 7.03 | 9.17 | 6.36 | 7.50 | 4.85 | 3.14 | 5.45 | 0.00 | 7.35 | 0.00 | 6.25 |
| LDPE | 1 | 1 | 0 | 0 | 0 | 0 | 0 | 0 | 0 | 0 | — |
| HDPE | 1 | 1 | 0 | 1 | 0 | 1 | 0 | 0 | 0 | 0 | — |
| TEFLON | 1 | 1 | 0 | 0 | 0 | 0 | 0 | 0 | 0 | 0 | — |
| PP | 1 | 1 | 1 | 1 | 0 | 1 | 0 | 0 | 0 | 0 | — |
| REISS RUBBER | 1 | 1 | — | — | — | — | — | — | — | — | — |
| FRC | 1 | 1 | 0 | 0 | 0 | 0 | 0 | 0 | 0 | 0 | — |
| BLACK DURANAR | 1 | 1 | 1 | 1 | 1 | 1 | 1 | 0 | 1 | 0 | — |
| SSSS DURANAR | 1 | 1 | 1 | 1 | 1 | 1 | 1 | 0 | 1 | 0 | — |
| SA CONC | 0 | 0 | 1 | 0 | 0 | 0 | 0 | 0 | 1 | 0 | — |
| LA CONC | 0 | 0 | 0 | 0 | 0 | 0 | 0 | 0 | 1 | 0 | — |
| GALV STEEL | 1 | 1 | 1 | 1 | 1 | 1 | 1 | 0 | 1 | 0 | — |
| ANDERSON VINYL | 1 | 1 | 0 | 1 | 1 | 0 | 1 | 0 | 1 | 0 | — |
| BROWN VINYL | 1 | 1 | 1 | 1 | 1 | 0 | 1 | 0 | 1 | 0 | — |
| TREATED PINE | 1 | 1 | 0 | 1 | 0 | 0 | 0 | 0 | 1 | 0 | — |
| DOUGLAS FIR | 1 | 1 | 1 | 1 | 1 | 0 | 1 | 0 | 1 | 0 | — |
| ANODIZED AL | 1 | 1 | 0 | 1 | 1 | 1 | 1 | 0 | 1 | 0 | — |
| GLASS | 1 | 1 | 1 | 1 | 1 | 1 | 1 | 0 | 1 | 0 | — |
| PVC | 1 | 1 | 0 | 1 | 1 | 0 | 1 | 0 | 1 | 0 | — |
| GRANITE | 1 | 1 | 1 | 1 | 1 | 0 | 1 | 0 | 1 | 0 | — |
| POWDER COAT | 1 | 1 | 1 | 1 | 1 | 0 | 1 | 0 | 1 | 0 | — |
| PAINTED AL | 1 | 1 | 1 | 1 | 1 | 0 | 1 | 0 | 1 | 0 | — |
| OSB | 1 | 1 | 1 | 0 | 0 | 0 | 0 | 0 | 1 | 0 | — |
| WOOD COMPOSITE | 1 | 1 | 1 | 1 | 0 | 1 | 0 | 0 | 1 | 0 | 0 |
| DP COMM WRAP D | 0 | 1 | 0 | 0 | 0 | 0 | — | 0 | 0 | 0 | — |
| DP FLASHING TAPE | 1 | 1 | 1 | 1 | 0 | 1 | — | 0 | 0 | 0 | — |
| DP FLEX WRAP | 1 | 1 | 0 | 0 | 0 | 0 | — | 0 | 0 | 0 | — |
| DP FLEXWRAP NF | 1 | 1 | 1 | 1 | 1 | 0 | — | 0 | 1 | 0 | — |

TABLE 7-continued

RESULTS OF EXAMPLES 18 AND 19 AND COMPARATIVE EXAMPLES 29-37

| | Example | | | | | | | | | | |
|---|---|---|---|---|---|---|---|---|---|---|---|
| | 18 | 19 | c29 | c30 | c31 | c32 | c33 | c34 | c35 | c36 | c37 |
| GRACE WALL FLASH | 0 | — | 1 | — | 0 | 1 | — | 0 | 1 | — | — |
| CARLISLE CCW705 | 0 | 1 | 1 | 1 | 1 | 1 | — | 0 | 1 | 0 | 1 |
| HENRY BS BREATHER | 0 | 1 | — | — | — | — | — | — | — | — | 0 |
| HENRY BS SA | 0 | 0 | 1 | 1 | 1 | 0 | — | 0 | 1 | 0 | — |
| HENRY BS SALT | 1 | 1 | — | — | — | 0 | — | — | — | — | 1 |
| HENRY BS TWF | 0 | 0 | 0 | 1 | 0 | 0 | — | 0 | 0 | 0 | — |
| PW BT 25XL | 0 | 1 | 1 | 1 | 0 | 0 | — | 0 | 1 | 0 | 1 |
| PW PS 45 FOIL FACE | 1 | 1 | 1 | 1 | 1 | 0 | — | 0 | 1 | 0 | 1 |
| PW SUPERSTICK | 0 | 1 | * | * | * | 0 | — | 0 | 1 | 0 | 0 |
| PW SAFE SEAL | 1 | 1 | 1 | 1 | 0 | 0 | — | — | 1 | 0 | 1 |

TABLE 8

LDPE RESULTS

| | Cure Conditions | | | | | |
|---|---|---|---|---|---|---|
| | 7 d RT | | 1 d H2O | | 7 d H2O | |
| Example | Peak pli (Nm$^{-1}$) | % Cohesive Failure | Peak pli (Nm$^{-1}$) | % Cohesive Failure | Peak pli (Nm$^{-1}$) | % Cohesive Failure |
| 18 | 6 (1050.8) | 100 | 9.3 (1628.7) | 60 | 11.3 (1979.0) | 53.3 |
| 19 | 10.7 (1873.9) | 100 | 14 (2451.8) | 60 | 16 (2802.1) | 43.3 |
| C29 | 2 (350.3) | 0 | 2 (350.3) | 0 | 2 (350.3) | 0 |
| C30 | 4 (700.5) | 0 | 4.7 (823.1) | 0 | 4 (700.5) | 0 |
| C31 | 2 (350.3) | 0 | 2 (350.3) | 0 | 2 (350.3) | 0 |
| C32 | 2 (350.3) | 0 | 4 (700.5) | 0 | 3.3 (577.9) | 0 |
| C33 | 2 (350.3) | 0 | 2 (350.3) | 0 | 2 (350.3) | 0 |
| C34 | 2 (350.3) | 0 | | | | |
| C35 | 2 (350.3) | 0 | 2 (350.3) | 0 | 2 (350.3) | 0 |
| C36 | 2.7 (472.9) | 100 | 2 (350.3) | 100 | 4 (700.5) | 100 |
| C37 | | | | | | |

TABLE 9

TEFLON RESULTS

| | Cure Conditions | | | | | |
|---|---|---|---|---|---|---|
| | 7 d RT | | 1 d H2O | | 7 d H2O | |
| Example | Peak pli (Nm$^{-1}$) | % Cohesive Failure | Peak pli (Nm$^{-1}$) | % Cohesive Failure | Peak pli (Nm$^{-1}$) | % Cohesive Failure |
| 18 | 9.3 (1628.7) | 100 | 8.7 (1523.6) | 100 | 11.3 (1979.0) | 80 |
| 19 | 10.0 (1751.3) | 100 | 14.0 (2451.8) | 93.3 | 13.3 (2329.2) | 13.3 |
| C29 | 2.0 (350.3) | 0 | 2.0 (350.3) | 0 | 2.0 (350.3) | 0 |
| C30 | 2.0 (350.3) | 0 | 2.0 (350.3) | 0 | 2.0 (350.3) | 0 |
| C31 | 2.0 (350.3) | 0 | 2.0 (350.3) | 0 | 2.0 (350.3) | 0 |
| C32 | 2.0 (350.3) | 0 | 2.0 (350.3) | 0 | 2.0 (350.3) | 0 |

TABLE 9-continued

TEFLON RESULTS

| | Cure Conditions | | | | | |
|---|---|---|---|---|---|---|
| | 7 d RT | | 1 d H2O | | 7 d H2O | |
| Example | Peak pli (Nm$^{-1}$) | % Cohesive Failure | Peak pli (Nm$^{-1}$) | % Cohesive Failure | Peak pli (Nm$^{-1}$) | % Cohesive Failure |
| C33 | 2.0 (350.3) | 0 | 3.3 (577.9) | 0 | 4.0 (700.5) | 0 |
| C34 | 2.0 (350.3) | 0 | * | * | * | * |
| C35 | 2.0 (350.3) | 0 | 2.0 (350.3) | 0 | 2.0 (350.3) | 0 |
| C36 | 3.3 (577.9) | 100 | 2.7 (472.9) | 100 | 2.7 (472.9) | 0 |
| C37 | * | * | * | * | * | * |

TABLE 10

DP COMM WRAP D RESULTS

| | Cure Conditions | | | | | |
|---|---|---|---|---|---|---|
| | 7 d RT | | 1 d H2O | | 7 d H2O | |
| Example | Peak pli (Nm$^{-1}$) | % Cohesive Failure | Peak pli (Nm$^{-1}$) | % Cohesive Failure | Peak pli (Nm$^{-1}$) | % Cohesive Failure |
| 18 | 8.7 (1523.6) | 100.0 | 10.0 (1751.3) | 100.0 | 6.0 (1050.8) | 20.0 |
| 19 | 12.0 (2101.6) | 100.0 | 14.0 (2451.8) | 100.0 | 14.7 (2574.4) | 11.7 |
| C29 | 0.9 (157.6) | 0.0 | 0.8 (140.1) | 0.0 | * | * |
| C30 | 2.1 (367.8) | 0.0 | 1.7 (297.7) | 0.0 | * | * |
| C31 | 1.0 (175.1) | 0.0 | * | * | * | * |
| C32 | 2.1 (367.8) | 0.0 | 8.0 (1401) | 0.0 | 3.1 (542.9) | 0.0 |
| C33 | * | * | * | * | * | * |
| C34 | * | * | * | * | * | * |
| C35 | 1.2 (210.2) | 0.0 | * | * | * | * |
| C36 | 4.6 (805.6) | 100.0 | 2.0 (350.3) | 100.0 | 1.1 (192.6) | 100.0 |
| C37 | * | * | * | * | * | * |

In tables 8-10 above, '7d RT' means the sample was cured for 7 days at room temperature before testing. '1d H2O' means the sample was cured for 7 days at room temperature and then submerged in water for 1 day before testing. '7d H2O' means the sample was cured for 7 days at room temperature, then submerged in water for 8 days before testing. '*' means the product fell off the substrate, so a value for adhesion could not be recorded.

INDUSTRIAL APPLICABILITY

The adhesive composition used herein is gunnable. "Gunnable" means the adhesive composition may be applied to a substrate with a standard caulking gun, and heat above ambient temperature is not required. (One skilled in the art will recognize that ambient temperature will vary depending on season and location but may be at least 20° C.)

The gunnable adhesive composition cures or hardens, or both, to form an adhesive product that is useful in commercial construction applications, such as in weather barriers. The gunnable adhesive composition provides unprimed adhesion to low energy substrates including polyolefins, such as polyethylenes. Exemplary polyethylenes include TYVEK® wraps, which are commercially available from DuPont of Wilmington, Del., U.S.A., tyvekinf@usa.dupont.com, and Perm-a-Barrier® and Bituthene® from W.R. Grace of W.R. Grace & Co.-Conn. of Cambridge, Mass., U.S.A.

The adhesive product prepared by curing the gunnable adhesive composition has good stress relaxation properties during thermal expansion. This renders the adhesive product useful for preparing wood/plastic composites. For example, in residential decking applications, the product may be useful for adhering fascia to sub-bases to offer enhanced aesthetics and reduce labour.

The adhesive product is useful in construction membrane applications, such as sill wraps, wall barrier sheets, flashings, and other weather barriers.

The gunnable adhesive composition may provide the additional benefits of being self levelling. The adhesive product may provide the additional benefits of high peel strength and capability to provide a bond between weather barrier and fenestration substrates to form a continuous weather barrier system.

The gunnable adhesive composition is a one-part adhesive composition, which eliminates the need for complicated mixing of two or more parts before application of the composition to the substrate.

The gunnable adhesive composition forms an adhesive product that adheres to the low surface energy substrates described above, and the gunnable adhesive composition can also adhere to other structural substrates (fenestration substrates) used in the construction industry. For purposes of this application, "Structural Substrates" means substrates which are used in the construction industry and do not have low surface energy, and which are exemplified by but not limited to, wood; metal such as copper, anodized aluminium, and steel; ceramics; rubberized asphalt; concrete; plastics such as polyvinyl chloride and polyvinylidene fluoride (PVDF); and glass. The gunnable adhesive composition may be used in a primerless method for adhering a construction membrane to a structure. "Primerless" means that no separate adhesion promoter need be applied to the construction membrane, or to the structure to which the construction membrane will be adhered, before application of the gunnable adhesive composition to the construction membrane and/or the structure. Furthermore, surface treatment (such as by plasma, corona, oxidation by ozone or oxidizing acids, sputter etching, or electron beam treatment) is also not required, and this step may be eliminated from the method to improve efficiency. The method may also be free of surface treatment. "Free of surface treatment" means that no surface treatment described above is performed on the construction membrane, or to the structure to which the construction membrane will be adhered, or both, before application of the gunnable adhesive composition to the construction membrane and/or the structure.

The adhesive product prepared by curing the gunnable adhesive composition may also offer the advantages of low temperature flexibility and moisture vapour permeability.

The invention claimed is:

1. A gunnable adhesive composition, which hardens to an adhesive product, where the gunnable adhesive composition comprises:
   I) a component selected from a mixture and a reaction product, or a combination thereof of ingredients a) and b), where
      ingredient a) is a silicone resin, which contains monofunctional units represented by $R^1_3SiO_{1/2}$ and tetrafunctional units represented by $SiO_{4/2}$, $R^1$ represents a substituted or unsubstituted monovalent hydrocarbon group and
      ingredient b) is an organopolysiloxane comprising difunctional units of the formula $R^2R^3SiO$ and terminal units of the formula $R^4_aX^1_{3-a}SiG$ where $R^2$ is an alkoxy group or a monovalent unsubstituted or substituted hydrocarbon group; $R^3$ is a unsubstituted or substituted monovalent hydrocarbon group; $R^4$ is aminoalkyl or $R^1$ group; $X^1$ is a hydrolysable group; G is an oxygen atom or a divalent group linking the silicon atom of the terminal unit with another silicon atom and a is 0 or 1,
   where the silicone resin and the organopolysiloxane are added in amounts to provide a ratio of the amount of silicone resin relative to the sum of the amounts of said resin in the organopolysiloxane (R/P ratio) ranging from 58% to 64%,
   II) a filler,
   III) a solvent,
   optionally
   IV) a silane crosslinker, and
   optionally
   V) a catalyst
   where the gunnable adhesive composition has
      a slump ranging from 0 mm to 5 mm at a temperature ranging from 0° C. to 100° C. as measured by ASTM C639, and
      an extrusion capability with a minimum of 10 mL/min as measured by ASTM C1183; and
   where the adhesive product has
      a movement capability per ASTM C719 ranging from +/−5% to +/−50%,
      a peak peel strength to low surface energy substrates and structural substrates of at least 5 pli (875.7 Nm$^{-1}$) as measured by ASTM C794 as modified.

2. The gunnable adhesive composition of claim 1, where ingredient a) has a weight average molecular weight greater than 3,000, and ingredient b) has a viscosity ranging from 0.02 Pa·s to 100 Pa·s at 25° C.

3. The gunnable adhesive composition of claim 1 further comprising an ingredient selected from: an adhesion promoter, a plasticizer, and a rheology modifier.

4. The gunnable adhesive composition of claim 1 where the catalyst is present.

5. A method of making the gunnable adhesive in accordance with claim 1 by mixing the ingredients present in a continuous, semi-continuous or batch process.

6. A method in accordance with claim 5 comprising a continuous method where ingredient IV) is present, and the method comprises:
   1) feeding ingredients I), II), and III) to a continuous mixing device while removing ingredient III);
   2) adding ingredient IV); and
   optionally
   3) adding additional solvent; and
   optionally
   4) adding ingredient V).

7. A method in accordance with claim 5 comprising a semi continuous method, where ingredient IV) is present and the method comprises:
   1) premixing ingredients I), II), and III);
   2) feeding the product of step 1) to a continuous mixing device while removing ingredient III);
   3) adding ingredient IV); and
   optionally
   4) adding additional solvent; and
   optionally
   5) adding ingredient V).

8. A method in accordance with claim 5 comprising a batch method where the method comprises:
   1) mixing ingredients I), II), III), and IV), while removing ingredient III); and
   2) adding additional solvent.

9. A method in accordance with claim 5 comprising a batch method where the method comprises:
   1) mixing ingredients I), II), III), and IV).

10. A method for adhering a construction membrane to a structure, where the method comprises:
   i) applying a gunnable adhesive composition in accordance with claim 1 to the construction membrane and/or the structure,
   ii) hardening the gunnable adhesive composition to form an adhesive product; and iii) adhering the construction membrane to the structure through the adhesive product;
with the proviso that the method is primerless and free of surface treatment.

11. A method comprising:
i) applying a gunnable adhesive composition in accordance with claim 1 to a construction membrane,
ii) hardening the gunnable adhesive composition to form an adhesive product, and
iii) adhering the construction membrane to a second construction membrane through the adhesive product;
with the proviso that the method is primerless and free of surface treatment.

12. The method of claim 10, where step ii) is performed before or during step iii).

13. The method of claim 10, where
ingredient a) has a number average molecular weight greater than 3,000, and
ingredient b) has a viscosity ranging from 0.02 Pa·s to 100 Pa·s at 25° C.

14. The method of claim 10, where the gunnable adhesive composition further comprises an ingredient selected from: a propellant, an adhesion promoter, a plasticizer, and a rheology modifier.

15. The method of claim 10, where step i) is performed at ambient temperature.

16. A barrier comprising:
I) a building wrap, and
II) a film of a gunnable adhesive composition on a surface of the building wrap, where the gunnable adhesive composition is in accordance with claim 1.

17. The barrier of claim 16, where
ingredient a) has a number average molecular weight greater than 3,000, and
ingredient b) has a viscosity ranging from 0.02 Pa·s to 100 Pa·s at 25° C.

18. The barrier of claim 16, where the gunnable adhesive composition further comprises an ingredient selected from: a propellant, an adhesion promoter, a plasticizer, and a rheology modifier.

19. The barrier of claim 16, where the building wrap comprises a polyolefin, a halogenated polyolefin, or a combination thereof.

20. A structure comprising the barrier of claim 16 adhered to a surface of the structure.

21. The structure of claim 20, where the barrier is selected from a sill wrap, a wall barrier sheet, a flooring barrier and an exterior insulation finishing system.

22. A building comprising:
I) a structure,
II) a film of an adhesive product, where the adhesive product is prepared by hardening a gunnable adhesive composition in accordance with claim 1, and
III) a building wrap adhered to the structure through the adhesive product.

23. The building of claim 22, where
ingredient a) has a weight average molecular weight greater than 3,000, and
ingredient b) has a viscosity ranging from 0.02 Pa·s to 100 Pa·s at 25° C.

24. The building of claim 22, where the gunnable adhesive composition further comprises an ingredient selected from: an adhesion promoter, a plasticizer, and a rheology modifier.

25. The building of claim 22, where the building wrap comprises a polyolefin, a halogenated polyolefin, or a combination thereof.

26. A method comprising:
i) applying a gunnable adhesive composition to a low surface energy substrate and/or a structural substrate, where the gunnable adhesive composition comprises
I) a component selected from a mixture and a reaction product, or a combination thereof of ingredients a) and b), where
ingredient a) is a silicone resin, which contains monofunctional units represented by $R^1_3SiO_{1/2}$ and tetrafunctional units represented by $SiO_{4/2}$, $R^1$ represents a substituted or unsubstituted monovalent hydrocarbon group and
ingredient b) is an organopolysiloxane comprising difunctional units of the formula $R^2R^3SiO$ and terminal units of the formula $R^4_aX^1_{3-a}SiG$ where $R^2$ is an alkoxy group or a monovalent unsubstituted or substituted hydrocarbon group; $R^3$ is a unsubstituted or substituted monovalent hydrocarbon group; $R^4$ is aminoalkyl or $R^1$ group; $X^1$ is a hydrolysable group; G is an oxygen atom or a divalent group linking the silicon atom of the terminal unit with another silicon atom and a is 0 or 1,
where the silicone resin and the organopolysiloxane are added in amounts to provide a ratio of the amount of silicone resin relative to the sum of the amounts of said resin in the organopolysiloxane (R/P ratio) ranging from 58% to 64%,
II) a filler,
III) a solvent,
optionally
IV) a silane crosslinker, and
optionally
V) a catalyst
where the gunnable adhesive composition has
a slump ranging from 0 mm to 5 mm at a temperature ranging from 0° C. to 100° C. as measured by ASTM C639, and
an extrusion capability with a minimum of 10 mL/min as measured by ASTM C1183;
ii) hardening the gunnable adhesive composition to form an adhesive product, where the adhesive product has
a movement capability per ASTM C719 ranging from +/−5% to +/−50%,
a peak peel strength to low surface energy substrates and structural substrates of at least 5 pli (875.7 Nm$^{-1}$) as measured by ASTM C794 as modified;
thereby adhering the adhesive product to the low surface energy substrate and the structural substrate.

27. A method comprising:
i) applying a gunnable adhesive composition in a gap between a low surface energy substrate and a structural substrate, where the gunnable adhesive composition comprises
I) a component selected from a mixture and a reaction product, or a combination thereof of ingredients a) and b), where
ingredient a) is a silicone resin, which contains monofunctional units represented by $R^1_3SiO_{1/2}$ and tetrafunctional units represented by $SiO_{4/2}$, $R^1$ represents a substituted or unsubstituted monovalent hydrocarbon group and
ingredient b) is an organopolysiloxane comprising difunctional units of the formula $R^2R^3SiO$ and terminal units of the formula $R^4_aX^1_{3-a}SiG$ where $R^2$ is an alkoxy group or a monovalent unsubstituted or substituted hydrocarbon group; $R^3$ is a unsubstituted or substituted monovalent hydrocarbon group; $R^4$ is aminoalkyl or $R^1$ group; $X^1$ is a hydrolysable group; G is an oxygen atom or a divalent group linking the silicon atom of the terminal unit with another silicon atom and a is 0 or 1, where the silicone resin and the organopolysiloxane are added in amounts to provide a ratio of the amount of silicone resin relative to the sum of the amounts of said resin in the organopolysiloxane (R/P ratio) ranging from 58% to 64%, II) a filler, III) a solvent, optionally IV) a silane crosslinker, and optionally V) a catalyst where the gunnable adhesive composition has a slump ranging from 0 mm to 5 mm at a temperature ranging from 0° C. to 100° C. as measured by ASTM C639, and an extrusion capability with a minimum of 10 mL/min as measured by ASTM C1183; and ii) hardening the gunnable adhesive composition to form an adhesive product, where the adhesive product has a movement capability per ASTM C719 ranging from +/−5% to +/−50%, and a peak peel strength to low surface energy substrates and structural substrates of at least 5 pli (875.7 $Nm^{-1}$) as measured by ASTM C794 as modified.

28. A method in accordance with claim 26 wherein the gunnable adhesive composition comprises:

a silane crosslinker.

\* \* \* \* \*